(12) United States Patent
Bates

(10) Patent No.: US 9,462,122 B1
(45) Date of Patent: Oct. 4, 2016

(54) SELECTIVE CALL ROUTING AND BLOCKING

(75) Inventor: Peter Bates, Morristown, NJ (US)

(73) Assignee: AOL Inc., Dulles, VA (US)

( * ) Notice: Subject to any disclaimer, the term of this patent is extended or adjusted under 35 U.S.C. 154(b) by 2428 days.

(21) Appl. No.: 11/146,284

(22) Filed: Jun. 7, 2005

Related U.S. Application Data

(60) Provisional application No. 60/627,144, filed on Nov. 15, 2004, provisional application No. 60/577,216, filed on Jun. 7, 2004.

(51) Int. Cl.
*H04M 3/42* (2006.01)
*H04M 3/436* (2006.01)

(52) U.S. Cl.
CPC .................................. *H04M 3/436* (2013.01)

(58) Field of Classification Search
CPC .......................... H04M 1/563; H04L 65/1096
USPC ............ 379/202.01, 201.01, 265.01–265.14, 379/266.01–266.1, 158, 179, 201.1, 207.16, 379/210.02
See application file for complete search history.

(56) References Cited

U.S. PATENT DOCUMENTS

| | | | |
|---|---|---|---|
| 5,200,995 A | 4/1993 | Gaukel et al. | |
| 5,887,056 A | 3/1999 | Sonnenberg | |
| 5,920,820 A * | 7/1999 | Qureshi et al. ................ 455/461 |
| 5,930,338 A * | 7/1999 | McKendry ............ H04M 1/006 379/142.07 |
| 6,052,372 A | 4/2000 | Gittins et al. | |
| 6,052,454 A * | 4/2000 | Kek .................... H04M 1/6505 379/188 |
| 6,144,644 A | 11/2000 | Bajzath et al. | |
| 6,229,879 B1 * | 5/2001 | Walker et al. .............. 379/88.01 |
| 6,330,317 B1 * | 12/2001 | Garfinkel ...................... 379/196 |
| 6,343,121 B1 | 1/2002 | Infosino | |
| 6,353,663 B1 | 3/2002 | Stevens et al. | |
| 6,477,374 B1 | 11/2002 | Shaffer et al. | |
| 6,483,910 B1 * | 11/2002 | Council ................... 379/127.01 |
| 6,498,841 B2 * | 12/2002 | Bull et al. ................. 379/142.08 |
| 6,574,335 B1 | 6/2003 | Kalmanek, Jr. et al. | |
| 6,606,647 B2 | 8/2003 | Shah et al. | |
| 6,614,781 B1 | 9/2003 | Elliott et al. | |
| 6,639,977 B1 | 10/2003 | Swope et al. | |
| 6,643,365 B1 * | 11/2003 | Dunn ................... H04Q 3/0029 379/211.02 |
| 6,650,742 B1 | 11/2003 | Elliott | |

(Continued)

OTHER PUBLICATIONS

Notice of Allowance for U.S. Appl. No. 11/020,679 dated Mar. 10, 2010, 9 pages.

(Continued)

*Primary Examiner* — William Deane, Jr.
(74) *Attorney, Agent, or Firm* — Finnegan, Henderson, Farabow, Garrett & Dunner LLP

(57) ABSTRACT

Managing an outgoing telephone call includes receiving a request for a telephone call to a first call participant from a second call participant. A list that is specified by the second call participant is accessed. The list specifies users of an electronic communications system for which contact information is maintained. Whether the first call participant is included in the list of users is determined. A group of one or more of the users included in the list of users with which the first call participant is associated is identified when the first call participant is included in the list of users. A rule associated with the identified group that indicates a manner in which electronic communications of the first or second call participants should be handled is accessed, and a manner in which the call should be handled that is in accordance with the accessed rule is identified.

47 Claims, 12 Drawing Sheets

(56) References Cited

U.S. PATENT DOCUMENTS

| | | | |
|---|---|---|---|
| 6,697,474 B1 | 2/2004 | Hanson et al. | |
| 6,735,295 B1 | 5/2004 | Brennan et al. | |
| 6,747,970 B1 | 6/2004 | Lamb et al. | |
| 6,748,072 B1 | 6/2004 | McGraw et al. | |
| 6,754,325 B1 * | 6/2004 | Silver | H04M 3/54 379/207.02 |
| 6,757,362 B1 | 6/2004 | Cooper et al. | |
| 6,757,371 B2 | 6/2004 | Kim et al. | |
| 6,798,755 B2 | 9/2004 | Lillie et al. | |
| 6,834,103 B1 | 12/2004 | Silver et al. | |
| 6,876,734 B1 | 4/2005 | Summers et al. | |
| 6,888,935 B1 | 5/2005 | Day | |
| 6,891,942 B1 * | 5/2005 | Porter | H04M 3/42 379/211.02 |
| 6,912,276 B1 * | 6/2005 | Olafsson et al. | 379/93.35 |
| 6,990,187 B2 * | 1/2006 | MacNamara et al. | 379/210.02 |
| 7,023,980 B2 * | 4/2006 | Lenard | 379/266.07 |
| 7,050,861 B1 * | 5/2006 | Lauzon | H04L 29/06027 379/188 |
| 7,099,452 B1 | 8/2006 | Infosino | |
| 7,113,582 B1 * | 9/2006 | Mangal | H04M 7/0057 379/220.01 |
| 7,130,405 B2 | 10/2006 | Brown et al. | |
| 7,177,316 B1 * | 2/2007 | Pilecek | 370/400 |
| 7,180,912 B1 * | 2/2007 | Samarasinghe | 370/474 |
| 7,197,560 B2 | 3/2007 | Caslin et al. | |
| 7,245,711 B2 * | 7/2007 | Margolis | 379/209.01 |
| 7,277,528 B2 * | 10/2007 | Rao et al. | 379/32.01 |
| 7,305,081 B1 | 12/2007 | Kalmanek et al. | |
| 7,317,716 B1 * | 1/2008 | Boni et al. | 370/352 |
| 7,342,920 B2 | 3/2008 | Ying et al. | |
| 7,352,854 B1 * | 4/2008 | Silver | H04M 3/4288 379/207.16 |
| 7,408,925 B1 | 8/2008 | Boyle et al. | |
| 7,418,091 B1 | 8/2008 | Sylvain | |
| 7,760,707 B1 | 7/2010 | Bates | |
| 7,995,728 B1 * | 8/2011 | Martin | H04M 3/42017 379/201.02 |
| 2001/0043691 A1 | 11/2001 | Bull | |
| 2002/0118807 A1 | 8/2002 | Pedersen | |
| 2002/0128033 A1 * | 9/2002 | Burgess | G06F 1/3209 455/528 |
| 2002/0168055 A1 * | 11/2002 | Crockett et al. | 379/88.01 |
| 2003/0007621 A1 | 1/2003 | Graves et al. | |
| 2003/0026416 A1 | 2/2003 | Fusco | |
| 2003/0076941 A1 * | 4/2003 | Tiliks et al. | 379/196 |
| 2003/0078081 A1 | 4/2003 | Schmier | |
| 2003/0091032 A1 | 5/2003 | Laxman et al. | |
| 2003/0112944 A1 | 6/2003 | Brown et al. | |
| 2003/0115070 A1 | 6/2003 | Brown et al. | |
| 2003/0156695 A1 | 8/2003 | Brown et al. | |
| 2003/0156700 A1 | 8/2003 | Brown et al. | |
| 2003/0161456 A1 | 8/2003 | Brown et al. | |
| 2003/0215078 A1 * | 11/2003 | Brahm et al. | 379/211.02 |
| 2003/0231619 A1 | 12/2003 | Akturk | |
| 2003/0235287 A1 * | 12/2003 | Margolis | 379/265.01 |
| 2004/0028208 A1 | 2/2004 | Carnazza et al. | |
| 2004/0114747 A1 | 6/2004 | Trandal et al. | |
| 2004/0133683 A1 | 7/2004 | Keller et al. | |
| 2004/0158647 A1 | 8/2004 | Omura | |
| 2004/0161080 A1 | 8/2004 | Digate et al. | |
| 2004/0161090 A1 | 8/2004 | Digate et al. | |
| 2004/0208308 A1 | 10/2004 | McGraw et al. | |
| 2004/0213396 A1 * | 10/2004 | MacNamara | H04M 3/436 379/210.02 |
| 2004/0225650 A1 | 11/2004 | Cooper et al. | |
| 2004/0246331 A1 * | 12/2004 | Caspi et al. | 348/14.08 |
| 2004/0260749 A1 * | 12/2004 | Trossen et al. | 709/200 |
| 2005/0010573 A1 | 1/2005 | Garg | |
| 2005/0053215 A1 | 3/2005 | Bedingfield | |
| 2005/0100008 A1 | 5/2005 | Miyata et al. | |
| 2005/0117726 A1 | 6/2005 | DeMent et al. | |
| 2005/0147224 A1 | 7/2005 | Olafsson et al. | |
| 2005/0201531 A1 | 9/2005 | Kanter et al. | |
| 2005/0249196 A1 * | 11/2005 | Ansari et al. | 370/352 |
| 2006/0165222 A1 | 7/2006 | Polcyn | |
| 2006/0239432 A1 | 10/2006 | Van Zandt et al. | |
| 2006/0291641 A1 * | 12/2006 | Barclay et al. | 379/211.03 |
| 2007/0003049 A1 * | 1/2007 | Florkey | H04M 3/436 379/230 |
| 2007/0016500 A1 * | 1/2007 | Chatterji | G06Q 40/08 705/35 |
| 2007/0123311 A1 | 5/2007 | Kim et al. | |
| 2007/0127707 A1 * | 6/2007 | Koser et al. | 379/373.03 |
| 2007/0189504 A1 * | 8/2007 | Silver | H04M 3/02 379/373.02 |
| 2007/0211698 A1 | 9/2007 | Fuller et al. | |
| 2008/0130860 A1 | 6/2008 | Mullis et al. | |
| 2008/0186164 A1 | 8/2008 | Emigh et al. | |
| 2009/0180422 A1 * | 7/2009 | Bohacek | H04M 7/12 370/328 |
| 2012/0071148 A1 * | 3/2012 | Voehringer | H04M 3/42 455/417 |

OTHER PUBLICATIONS

USPTO Non-final Office Action, U.S. Appl. No. 11/020,679, mailed Apr. 6, 2009, 26 pages.
USPTO Non-final Office Action, U.S. Appl. No. 11/020,681, mailed Jan. 26, 2009, 16 pages.
USPTO Non-final Office Action, U.S. Appl. No. 11/020,680, mailed Feb. 6, 2009, 17 pages.
USPTO Final Office Action, U.S. Appl. No. 11/020,681, mailed Jul. 27, 2009, 26 pages.
Office Action dated Aug. 20, 2013, from U.S. Appl. No. 12/758,494 (12 pages).
Office Action dated Mar. 25, 2013, from U.S. Appl. No. 12/758,494 (11 pages).
Office Action dated Mar. 13, 2012, from U.S. Appl. No. 12/758,494 (12 pages).
Office Action dated Sep. 15, 2011, from U.S. Appl. No. 12/758,494 (11 pages).
Office Action dated Apr. 5, 2011, from U.S. Appl. No. 12/758,494 (12 pages).
Office Action dated Oct. 30, 2009, from U.S. Appl. No. 11/020,679 (37 pages).
Office Action dated Nov. 10, 2009, from U.S. Appl. No. 11/020,680 (16 pages).
Office Action dated Jul. 27, 2009, from U.S. Appl. No. 11/020,681 (24 pages).

* cited by examiner

SELECTIVE CALL ROUTING AND BLOCKING

CROSS REFERENCE TO RELATED APPLICATIONS

This application claims the benefit of U.S. Provisional Application No. 60/627,144, filed Nov. 15, 2004, and titled "Voice over Internet Protocol Call Handling," and U.S. Provisional Application No. 60/577,216, filed Jun. 7, 2004, and titled "Voice over Internet Protocol Application Development Framework." The entire contents of both of these applications are incorporated by reference in their entirety.

TECHNICAL FIELD

This document relates to systems that provide telephone services using Voice over Internet Protocol (VoIP).

BACKGROUND

In a typical VoIP communications system, a network services provider (i.e., the owner and manager of a network/telephony infrastructure) and a telephone services provider (i.e., a customer-facing provider of telephony services) work together to offer VoIP services to customers over a data network. The network services provider controls the physical media through which the VoIP data travels (e.g., the fiber-optic network and the optical networking equipment) and the proxy servers and voice gateway routers that direct and control the flow of VoIP data. The underlying system is generally capable of creating a basic communications session, with assistance of the telephone services provider in the form of subscriber identifying information (e.g., a telephone number). The telephone services provider typically develops the voice applications that enable the proxy servers and voice gateway routers to handle VoIP calls in accordance with the VoIP telephone services offered by the telephone services provider. The telephone services provider also controls back-end computer systems that may be accessed by the proxy servers or voice gateway routers in response to procedure calls generated while executing a voice application. The back-end computer systems typically store customer-specific, voice-services-related configuration data.

The proxy servers and the voice gateway routers manage the voice paths of VoIP calls and the signaling used to setup and tear down the VoIP calls in accordance with the voice applications developed by the telephone services provider. The voice applications are typically scripts containing Application Programming Interface (API) commands that, when executed by a voice gateway router, manage a VoIP call in accordance with a VoIP service offered to a customer. More particularly, call signals arrive at the voice gateway router, and the voice gateway router processes the signals in a pre-defined manner that is indicated by the API-based voice applications. At well defined points in the processing of the messaging, the voice gateway router may use API commands to retrieve particular pieces information required by the voice applications. The API commands facilitate development of voice applications and, hence, VoIP services by providing building blocks that may be put together to construct voice applications that offer typical voice services.

SUMMARY

In one general aspect, managing an outgoing telephone call includes receiving a request for a telephone call to a first call participant from a second call participant. A list that is specified by the second call participant is accessed. The list specifies users of an electronic communications system for which contact information is maintained. Whether the first call participant is included in the list of users is determined. A group of one or more of the users included in the list of users with which the first call participant is associated is identified when the first call participant is included in the list of users. A rule associated with the identified group that indicates a manner in which electronic communications of the first or second call participants should be handled is accessed, and a manner in which the call should be handled that is in accordance with the accessed rule is identified.

Implementations may include one or more of the following features. For example, the call may be handled in accordance with the identified manner.

Accessing a rule may include accessing a rule that indicates how the call should be handled based on an availability of the first call participant or the second call participant to participate in the call. Identifying a manner in which the call should be handled may include accessing an indication of an availability of the first call participant or the second call participant to participate in the call. A manner in which the call should be handled may be identified based on the accessed indication. Accessing an indication of availability of the first call participant or the second call participant to participate in the call may include accessing an indication of an event from an electronic calendar of the first call participant or the second call participant.

Accessing a rule may include accessing a rule that indicates how the call should be handled based on an online presence of the first call participant or the second call participant. Identifying a manner in which the call should be handled may include accessing an indication of an online presence of the first call participant or the second call participant. A manner in which the call should be handled may be identified based on the accessed indication.

Accessing a rule may include accessing a rule that indicates a time at which a call to the first call participant or from the second call participant is to be blocked or allowed. Identifying a manner in which the call should be handled may include accessing an indication of a time at which the request for the call to the first call participant was received. The time at which the request was received may be compared to the time at which a call to the first call participant or from the second call participant is to be blocked or allowed. A manner in which the call should be handled may be identified based on a result of the comparison.

Accessing a rule may include accessing a rule that indicates a time at which a call to the first call participant or from the second call participant is to be allowed. Identifying a manner in which the call should be handled may include accessing an indication of a time at which the request for the call to the first call participant was received. The time at which the request was received may be compared to the time at which a call to the first call participant or from the second call participant is to be allowed. A manner in which the call should be handled may be identified based on a result of the comparison.

Accessing a rule may include accessing a rule that indicates a maximum allowable amount of time for which the first call participant may participate in telephone calls during a period of time. Identifying a manner in which the call should be handled may include accessing an indication of an amount of time for which the first call participant has participated in telephone calls during the period of time. The amount of time for which the first call participant has participated in telephone calls may be compared to the maximum allowable amount of time. A manner in which the call should be handled may be identified based on a result of the comparison. The amount of time may include an aggregated amount of time for all telephone calls during the period of time. The amount of time also may include an amount of time spent with one second call participant. The second accessing and the comparing steps may be performed with respect to the amount of time spent with the second call participant during the period of time.

Accessing a rule may include accessing a rule that indicates a maximum allowable number of telephone calls in which the first call participant may participate during a period of time. Identifying a manner in which the call should be handled may include accessing an indication of a number of telephone calls in which the first call participant has participated during the period of time. The number of telephone calls in which the first call participant has participated may be compared to the maximum allowable number of telephone calls. A manner in which the call should be handled may be identified based on a result of the comparison.

Accessing a rule may include accessing a rule that indicates at least one person to whom the second call participant may or may not place telephone calls. Identifying a manner in which the call should be handled may include identifying the first call participant as a person to whom the call was placed. The first call participant may be compared to the at least one indicated person. A manner in which the call should be handled may be identified based on a result of the comparison. The person may be identified and the rule is accessed by at least one of an online identifier, a given name, an alias, a phone number, and another identifier.

Accessing a rule may include accessing a rule that indicates at least one person from whom the first call participant may or may not receive telephone calls. Identifying a manner in which the call should be handled may include identifying the second call participant as a person from the call was received. The second call participant may be compared to the at least one indicated person. A manner in which the call should be handled may be identified based on a result of the comparison. The person may be identified and the rule is accessed by at least one of an online identifier, a given name, an alias, a phone number, and another identifier.

Accessing a rule may include accessing a rule that indicates how the call should be handled based on an importance of the call. Identifying a manner in which the call should be handled may include accessing an indication of an importance of the call, and identifying a manner in which the call should be handled based on the accessed indication.

Accessing a rule may include accessing a rule that indicates how the call should be handled based on a characteristic of the first call participant or the second call participant. Identifying a manner in which the call should be handled may include accessing an indication of a characteristic of the first call participant or the second call participant, and identifying a manner in which the call should be handled based on the accessed indication. The characteristic may be at least one of an age, a gender, an occupation, a location, a characteristic indicated by a profile of the first or second call participant, a characteristic indicated by other electronic content associated with the first or second call participant, or another characteristic of the first or second call participant.

Accessing a rule may include accessing a rule that indicates that the call should be delivered to an intended recipient if the intended recipient is included in the group of one or more users. Identifying a manner in which the call should be handled may include determining that the first call participant is included in the group of one or more users, and determining that the call should be delivered to the first call participant because the first call participant is included in the group of one or more users.

Accessing a rule may include accessing a rule that was specified by a supervisor of the first call participant or the second call participant. Accessing a list of users of an electronic communications system may include accessing a list of users of an instant messaging system for which presence information is maintained, or an address book of an e-mail system.

Identifying a manner in which the call should be handled may include identifying that the second call participant should be identified for the first call participant before the first call participant is allowed to answer the call. Identifying a manner in which the call should be handled may include identifying that the call should be delivered to the first call participant, or identifying that the call should be blocked from the first call participant. Identifying a manner in which the call should be handled also may include identifying a tone with which the call should ring for the first call participant, or identifying that the call should ring busy for the second call participant.

Identifying a manner in which the call should be handled may include identifying a system to which the call should be routed that is different than a system to which the call was to be routed originally. The different system may be a voicemail system, and identifying the different system may include identifying the voicemail system. Identifying a manner in which the call should be handled also may include identifying an alert of the call to be presented to the first call participant, or identifying a pre-recorded message to be played to the first call participant or the second call participant.

Receiving a request for a telephone call may include receiving, at a telephony services provider, the request for the telephone call over a signaling path from a first telephony proxy server associated with first call recipient or from a second telephony proxy server associated with the second call recipient. The first and second telephony proxy servers may be controlled by a telephony infrastructure provider. Accessing the list of users may include accessing, at the telephony services provider, the list of users from a back-end system controlled by the telephony services provider. Accessing the rule may include accessing, at the telephony services provider, the rule from a back-end system controlled by the telephony services provider. Handling the call may include establishing a voice path between the first telephony proxy sever and the second telephony proxy server. The voice path may be controlled with signals sent from the telephony services provider to the first proxy server over a first signaling path or to the second telephony proxy server over a second signaling path. The signals may indicate the identified manner in which the call should be handled.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

Telephone calls are handled in accordance with one or more call handling rules. The call handling rules are associated with a group of one or more users of an electronic communications system that are included in a list of users of the electronic communications system. When a call to or from a user is received, a group within the list of users to which the user corresponds is identified. The call handling rules associated with the identified group are accessed and used to identify how the call should be handled, and the call is handled in accordance with the identified rules. The call handling rules may consider information that is not available to a system actually handling the call when identifying how the call should be handled. For example, the call handling rule may consider an electronic calendar of a call participant, an amount of time for which a call participant has participated in telephone calls, online presence of the call participant, or an importance of the call when identifying how the call should be handled.

Figure 1:
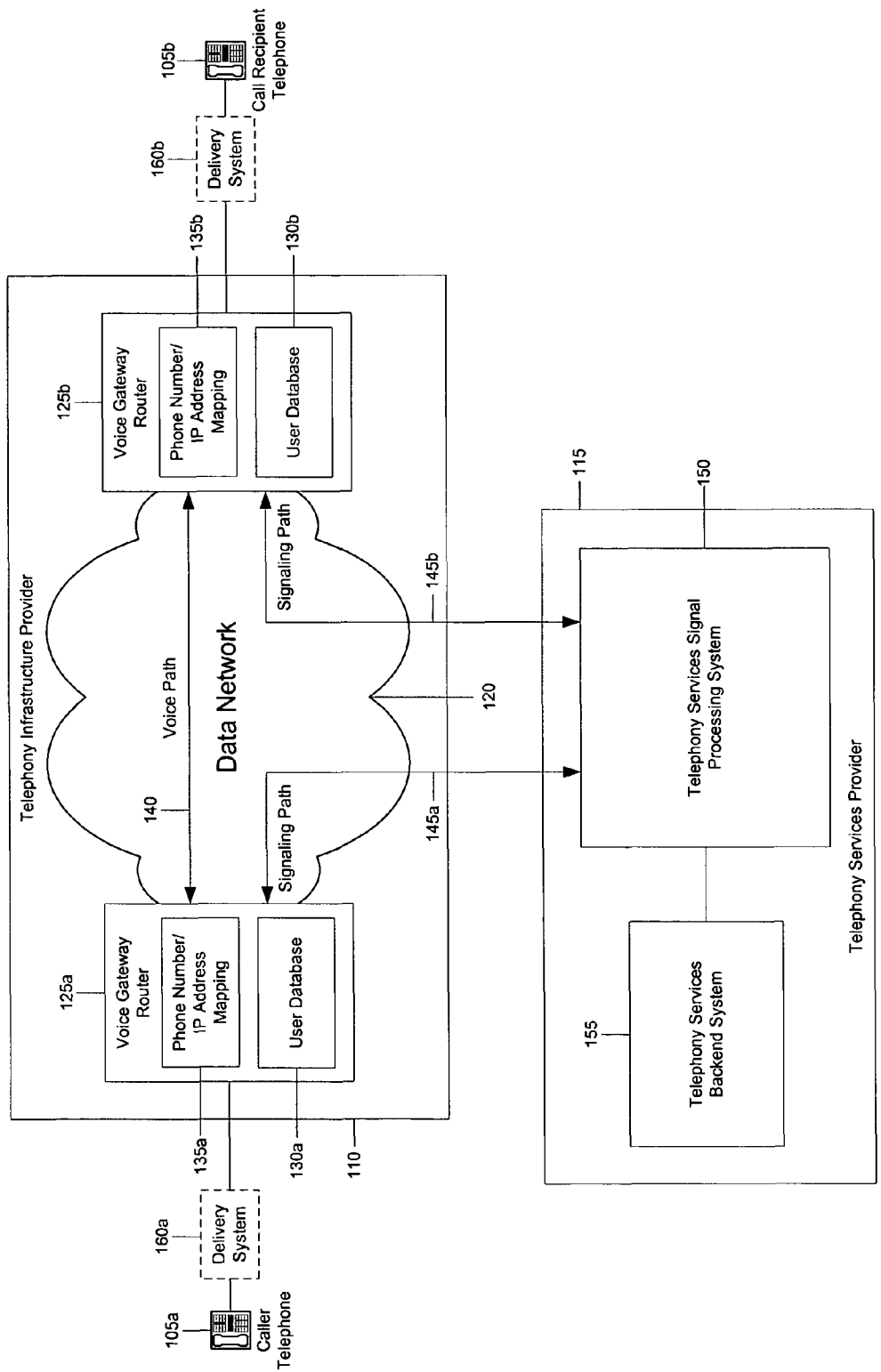
FIG. 1 is a block diagram of a communications system for providing telephone services.

Referring to FIG. 1, an enhanced communications system 100 provides VoIP telephone services through use of voice applications that directly process signaling information used to establish VoIP calls. The communications system 100 controls calls placed between a caller telephone 105a and a call recipient telephone 105b. The call is serviced by a telephony infrastructure provider 110 that receives instructions for handling the call from a telephony services provider 115. The telephony infrastructure provider 110 includes a data network 120 and voice gateway routers 125a and 125b. The voice gateway routers 125a and 125b include respective user databases 130a and 130b and respective mappings 135a and 135b. The voice gateway routers 125a and 125b establish a voice path 140 between themselves and respective signaling paths 145a and 145b between each of them and the telephony services provider 115. The telephony services provider 115 includes a telephony services signal processing system 150 and a telephony services back-end system 155. The telephones 105a and 105b communicate with the telephony infrastructure provider 110 through respective optional delivery systems 160a and 160b, respectively.

The caller telephone 105a is configured to place a call to, or to receive a call from, the call recipient telephone 105b using the telephony infrastructure provider 110. Each of the telephones 105a and 105b may be a landline or wireline phone, a wireless phone, a cellular phone, a mobile personal digital assistant (PDA) with embedded cellular phone technology, or a soft phone, which is a telephone integrated into a computer system. Alternatively or additionally, each of the telephones 105a and 105b may be integrated into a client computer system.

The telephony infrastructure provider 110 provides infrastructure that may be used to operate calls between the telephones 105a and 105b. The telephony infrastructure provider 110 does not determine how the calls between the telephones 105a and 105b should be controlled. Instead, the telephony infrastructure provider 110 relies on the telephony services provider 115 to indicate how the calls should be controlled. In one implementation, communications between the components of the telephony infrastructure provider 110 are packet-based communications that use Internet Protocol (IP).

The telephony services provider 115 determines how the calls between the telephones should be controlled. The telephony services provider 115 instructs the telephony infrastructure provider 110 to control a call between the telephones 105a and 105b in an identified manner. The telephony services provider 115 determines how to control the call based on information that may be accessed only by the telephony services provider 115 and not by the telephony infrastructure provider 110. The telephony services provider may provide Session Initiation Protocol (SIP) signals, H.323 signals, Media Gateway Control Protocol (MGCP) signals, Media Gateway Control (Megaco) signals, Simple Gateway Control Protocol (SGCP) signals, or other types of call handling signals to the telephony infrastructure provider 110 to identify how the call should be handled. In one implementation, the telephony services provider 115 also is an Internet service provider (ISP), and the information that may be accessed only by the telephony services provider may relate to Internet use of customers of the ISP, as well as to other services provided by the ISP. In such implementations, users of the telephones 105a and 105b may be customers of the ISP. As a result, the ISP may provide information relating to Internet use of the users to the telephones 105a and 105b. Furthermore, information describing phone usage and call handling preferences of the users may be presented to the users when the users access the ISP, for example, with a computer.

The data network 120 is configured to enable direct or indirect communications between the voice gateway routers 125a and 125b. The data network 120 may include, for example, one or more of the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The voice gateway routers 125a and 125b route calls between the telephones 105a and 105b. The voice gateway router 125a is associated with the telephone 105a and with a user of the telephone 105a, and the voice gateway router 125b is associated with the telephone 105b and with a user of the telephone 105b. When the voice gateway router 125a receives a call placed from the telephone 105a to the telephone 105b serviced by the voice gateway router 125b, the voice gateway router 125a determines if the call was placed by a user whose calls are controlled by the telephony services provider 115. If so, then the call is routed to the telephony services provider 115 such that the telephony services provider 115 may control the call. If not, then the call is routed to the voice gateway router 125b, which services the telephone 105b, such that the call may be handled normally. The voice gateway router 125b operates in a corresponding manner when a call is placed from the telephone 105b to the telephone 105a. When a call is handled by the telephony services provider 115, the voice gateway routers 125a and 125b receive call handling signals from the telephony services provider 115. The voice gateway routers 125a and 125b execute the received call handling signals to handle the call in a manner identified by the telephony services provider 115. The voice gateway routers 125a and 125b also may be referred to as edge proxy servers or PSTN gateways.

The user databases 130a and 130b enable the voice gateway routers 125a and 125b, respectively, to determine whether received calls should be handled by the telephony services provider 115. More particularly, the user databases 130a and 130b include indications of users of telephones serviced by the voice gateway routers 125a and 125b, respectively, whose calls are controlled by the telephony services provider 115. When a call is received at one of the voice gateway routers 125a and 125b, the voice gateway router may determine that the call should be routed to the telephony services provider 115 when one or more people involved in the call are included in the corresponding user database. The people involved in the call may be identified based on information included in the call, such as the source and destination phone numbers for the call.

The mappings 135a and 135b enable the voice gateway routers 125a and 125b to route calls to telephones serviced by the voice gateway routers 125a and 125b, respectively. More particularly, the mappings 135a and 135b relate phone numbers to IP addresses of telephones that correspond to the phone numbers. Each of the mappings 135a and 135b includes entries for each telephone serviced by the corresponding voice gateway routers 125a and 125b. For example, the voice gateway router 125a may use the mapping 135a to identify an IP address of the telephone 105a when the voice gateway router 125a receives a call to the telephone 105a from, for example, the telephone 105b. In one implementation, the voice gateway router 125b may route the call from the telephone 105b to the voice gateway router 125a based on characteristics of the phone number or the location to which the call is placed. For example, the telephone 105a may be serviced by the voice gateway router 125a as a result of being in a particular location or having a particular phone number. In another implementation, the voice gateway router 125b may route the call to the voice gateway router 125a because the voice gateway router 125a may have informed the voice gateway router 125b that the voice gateway router 125a services the telephone 105a. The voice gateway router 125b may use the mapping 135b to route calls to the telephone 105b in a corresponding manner.

Voice data for a call between the telephones 105a and 105b is sent between the voice gateway routers 125a and 125b through the network over the voice path 140. In addition, signals for controlling the call may be sent over signaling paths 145a and 145b. The signaling paths 145a and 145b are established when the call is to be handled by the telephony services provider 115. Otherwise, a signaling path is established between the voice gateway routers 125a and 125b.

The telephony services signal processing system 150 identifies call handling signals that are used by the voice gateway routers 125a and 125b to control a call between the telephones 105a and 105b. The telephony services signal processing system 150 preferably includes one or more applications that may cause the call to be controlled in a particular manner, by producing call handling signals for the call. One or more of the applications may be selected for execution based on call handling preferences of a user involved in the call.

The call handling preferences, as well as other information needed by the selected applications, may be accessed from the telephony services back-end system 155. In implementations where the telephony services provider 115 also is an ISP, the telephony services back-end system 155 may include information relating to how the user involved in the call uses the ISP. For example, the information may include indications of people with which the user may or may not communicate, events from an electronic calendar of the user, availability of the user, an activity undertaken by the user, times at which calls to the user are blocked or allowed, a maximum allowable amount of time for which the user may participate in telephone calls, and parental controls.

In some implementations, the telephones 105a and 105b are VoIP telephones that may communicate directly with the telephony infrastructure provider 110, for example, using the voice gateway routers 125a and 125b. In such implementations, the delivery systems 160a and 160b are not required. In other implementations, the telephones 105a and 105b are circuit-switched telephones, in which case the delivery systems 160a and 160b are needed to enable the telephones 105a and 105b to communicate with the telephony infrastructure provider 110. The delivery systems 160a and 160b convert circuit-switched data from the telephones 105a and 105b into packets of data that may be used by the telephony infrastructure provider 110. Each of the delivery systems 160a or 160b may be a public switched telephone network (PSTN) or a private branch exchange (PBX) that that may communicate with the telephony services provider 115. Alternatively or additionally, each of the delivery systems 160a and 160b may be an adapter configured to convert data from a circuit-switched telephone into data that may be used by the telephony infrastructure provider 110.

Figure 2:
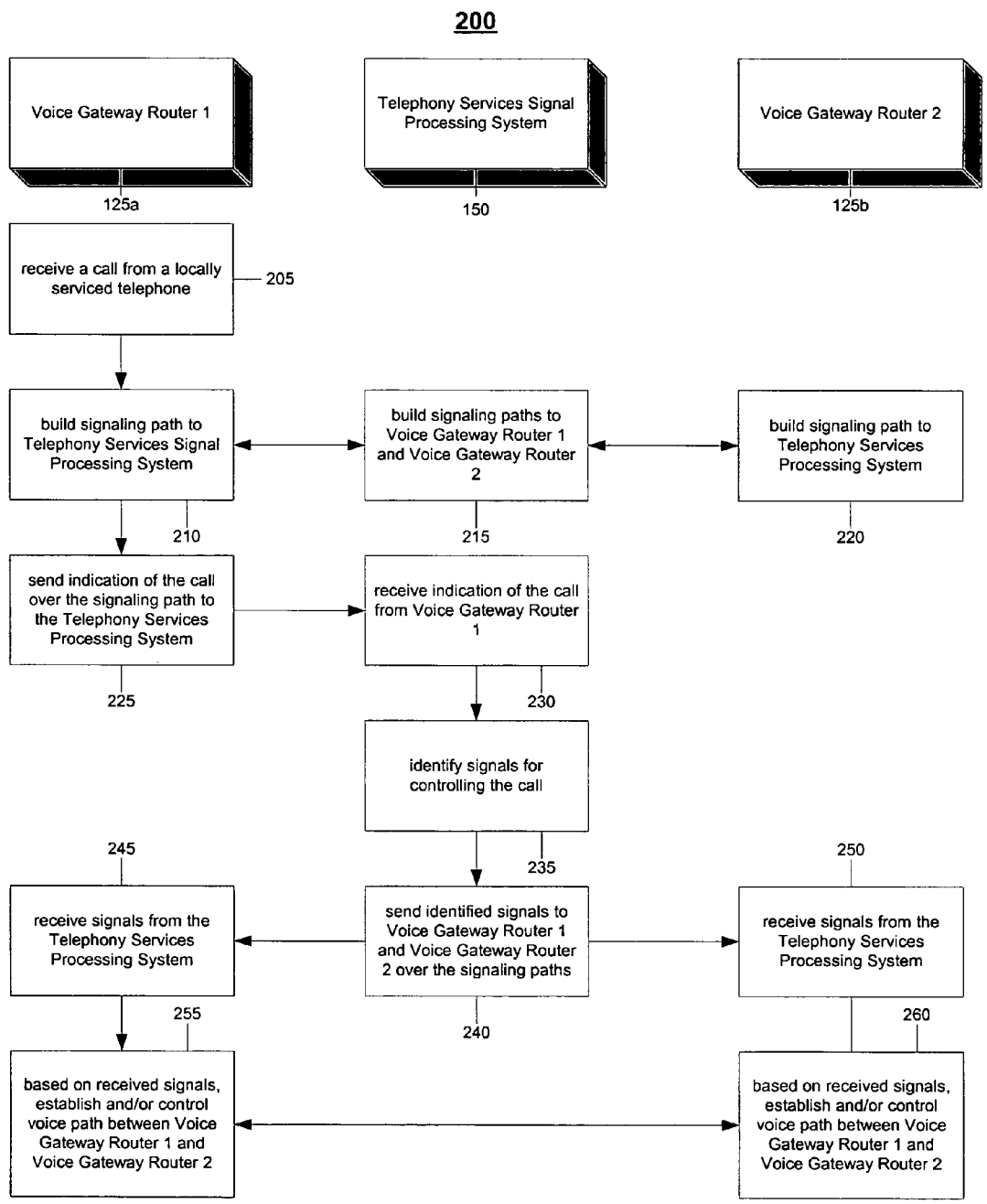
FIG. 2 is a flow chart of a process for controlling a telephone call.

FIG. 2 is a flow chart of a process 200 for handling a call in the enhanced communications system 100. The call is placed from a telephone serviced by a first voice gateway router 125a to a telephone serviced by a second voice gateway router 125b. A signaling path for the call is routed through a telephony services signal processing system 150. The telephony services signal processing system 150 identifies signals for controlling the telephone calls, and the identified signals are sent to the voice gateway routers 125a and 125b to establish or control a voice path between the voice gateway routers 125a and 125b.

The process begins when the voice gateway router 125a receives a call from a locally serviced telephone (205). For example, the voice gateway router 125a may receive the call from the caller telephone 105a of FIG. 1. In implementations where the locally serviced telephone is not a VoIP telephone, the call may be received through a delivery system, such as the delivery system 160a of FIG. 1. The voice gateway router 125a determines whether the call should be routed through the telephony services signal processing system 150. Such a determination may be based on a user database maintained by the voice gateway router 125a, such as the user database 130a of FIG. 1. The user database identifies people whose calls are specially handled by the telephony services signal processing system 150. The voice gateway router 125a may identify people involved in the call based on, for example, phone numbers or IP addresses associated with the call. If the identified people are found in the user database, then the call may be routed through the telephony services signal processing system 150.

When the call is to be routed through the telephony services signal processing system 150 such that the telephony services signal processing system 150 may control the call, the voice gateway router 125a builds a signaling path to the telephony services signal processing system 150 (210). In response, the telephony services signal processing system 150 builds signaling paths to the voice gateway routers 125a and 125b (215), and the voice gateway router builds a signaling path to the telephony services signal processing system 150 (220). As a result, the telephony services signal processing system 150 may send signals for controlling the call to the voice gateway routers over the signaling paths that have been established.

The voice gateway router 125a sends an indication of the call to the telephony services signal processing system 150 over the signaling path to the telephony services signal processing system 150 (225). The indication of the call may include a telephone number or an IP address from which the call was placed, a telephone number or an IP address to which the call was placed, identifiers of people involved in the call, and a time at which the call was placed. The telephony services signal processing system 150 receives the indication of the call from the voice gateway router 125a over the signaling path (230).

The telephony services signal processing system 150 uses the received indication of the call to identify signals for controlling the call (235). The telephony services signal processing system 150 may identify the signals by executing one or more call handling applications included in the telephony services signal processing system 150. The applications may use information that may be accessed from a telephony services back-end system, such as the telephony services back-end system 155 of FIG. 1. The call handling applications that are executed by the telephony services signal processing system 150 may be selected based on call handling preferences for a participant of the call. The chosen applications identify the signals such that the call is controlled in a manner that is consistent with the call handling preferences.

The telephony services signal processing system 150 sends the identified signals to the voice gateway routers 125a and 125b over the signaling paths 145a and 145b that have been established to the voice gateway routers 125a and 125b (240). The voice gateway routers 125a and 125b receive the signals from the telephony services signal processing system 150 (245, 250). In one implementation, the telephony services signal processing system 150 sends only the signals to be used by the voice gateway router 125a to the voice gateway router 125a, and only the signals to be used by the voice gateway router 125b to the voice gateway router 125b.

The voice gateway routers 125a and 125b use the received signals to establish and/or control a voice path 140 between the voice gateway routers 125a and 125b (255, 260). For example, if the received signals indicate that the call should be allowed without restriction, then the voice path is established such that the people involved in the call may communicate over the voice path. In addition, other audio data, such as alerts and ring tones, may be presented to the people involved in the call over the voice path, as may be indicated by the received signals.

As the call is operating, the telephony services signal processing system 150 may continue to identify additional signals for controlling the call, and the identified signals may be sent to the voice gateway routers 125a and 125b. The additional signals may be identified at any time, in response to any stimuli deemed important to the call or the participants of the call. Among these stimuli are dynamic, evolving context of the call, the participants, or external factors that affect or are affected by the session. The additional signals may be identified using any application included in the telephony services signal processing system 150 that applies to the call or to the participants. After the call has been completed, the voice gateway routers 125a and 125b may tear down the voice path and the signaling paths.

In the implementation of the process 200 illustrated in FIG. 2, the voice gateway router 125a sends to the telephony services signal processing system 150 an indication of the call because calls to or from a user that placed the calls are controlled by the telephony services signal processing system 150. In such an implementation, the voice gateway router 125b may not receive an indication of the call until the telephony services signal processing system 150 establishes a signaling path to the voice gateway router. In other implementations of the process 200, the voice gateway router 125b may send the telephony services signal processing system 150 an indication of the call, even though the call was placed from a telephone serviced by the voice gateway router 125a, because calls to or from a user to which the call was placed are controlled by the telephony services signal processing system 150. In such implementations, the voice gateway router 125a may establish a signaling path and may forward an indication of the call to the voice gateway router 125b. Upon a determination that the call is to be controlled, the voice gateway router 125b may tear down the signaling path to the voice gateway router 125a, and may forward an indication of the call to the telephony services signal processing system 150.

Figure 3:
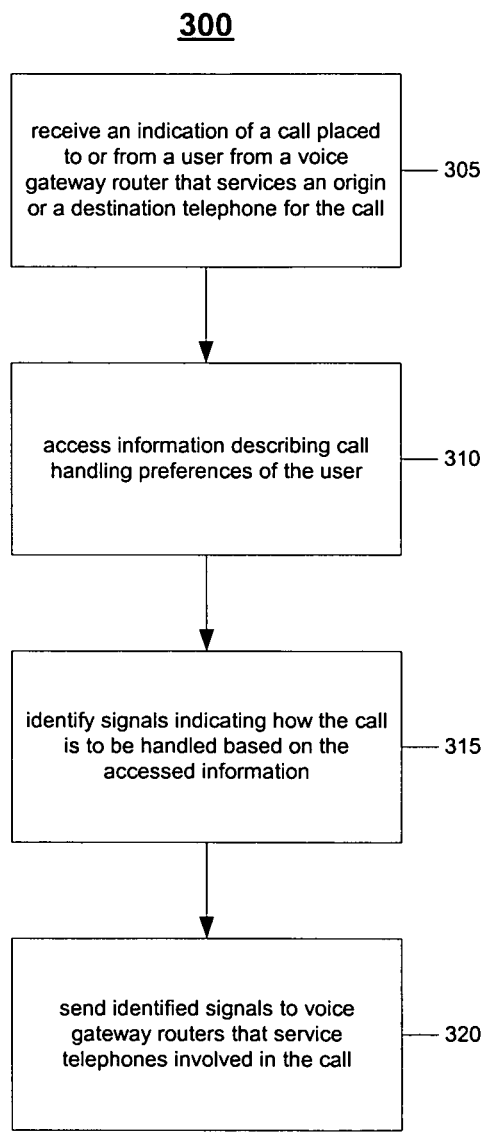
FIG. 3 is a flow chart of a process for identifying control signals for applying services to a telephone call.

Referring to FIG. 3, a process 300 is used to identify signals for controlling a received call. The process 300 may be executed by a telephony services signal processing system of a telephony services provider, such as the telephony services signal processing system 150 of FIG. 1. The telephony services signal processing system is an entity distinct from a telephony infrastructure provider that operates the call in accordance with the identified signals. The telephony services signal processing system identifies the signals using information that may not be accessed by the telephony infrastructure provider.

The process 300 begins when the telephony services provider receives an indication of a call placed to or from a user whose calls are controlled by the telephony services provider (305). The indication of the call is received from a voice gateway router that services an origin or a destination of the call. More particularly, the indication of the call is received from a voice gateway router that services a telephone that is used by a user whose calls are controlled by the telephony services signal processing system 150. The indication of the call may be received over a signaling path that has been established between the voice gateway router and the telephony services signal processing system 150.

The telephony services signal processing system accesses information describing call handling preferences of the user (310). The information may be accessed from a telephony services back-end system, such as the telephony services back-end system 155 of FIG. 1. The call handling preferences for the user may indicate times at which the user desires and does not desire to receive calls. The times at which the user may and may not receive the calls may be indicated by electronic calendar events maintained in an electronic calendar of the user. The call handling preferences also may indicate people with whom the user may or may not desire to communicate. The people may be indicated by contact lists maintained by the user, such as an e-mail address book or an instant messaging buddy list of the user. The call handling preferences may indicate that alerts and reminders of, for example, tasks and calendar events are to be presented to the user while the user is participating in a telephone call.

The telephony services signal processing system identifies signals indicating how the call is to be handled based on the accessed information (315). The signals may be identified through execution of one or more applications included in the telephony services signal processing system. Each of these applications identifies signals for handling the call in a particular manner. The applications that are executed to identify the signals may be selected in a manner indicated by the call handling preferences accessed for the user. For example, if the call handling preferences indicate that the user is to be provided with reminders of events from an electronic calendar maintained by the user while the user is participating in a call, an application for providing the user with the reminders may be executed. The applications may access information from the telephony services back-end system while executing. For example, the application for providing the user with the reminders may access the electronic calendar event for which a reminder is to be provided from the telephony services back-end system.

The identified signals are sent to voice gateway routers that service telephones involved in the call (320). The voice gateway routers execute the signals to control the call in the manner identified by the telephony services signal processing system. Using the example from above, executing the received signals may result in the user being provided with the reminder of the calendar event.

Figure 4:
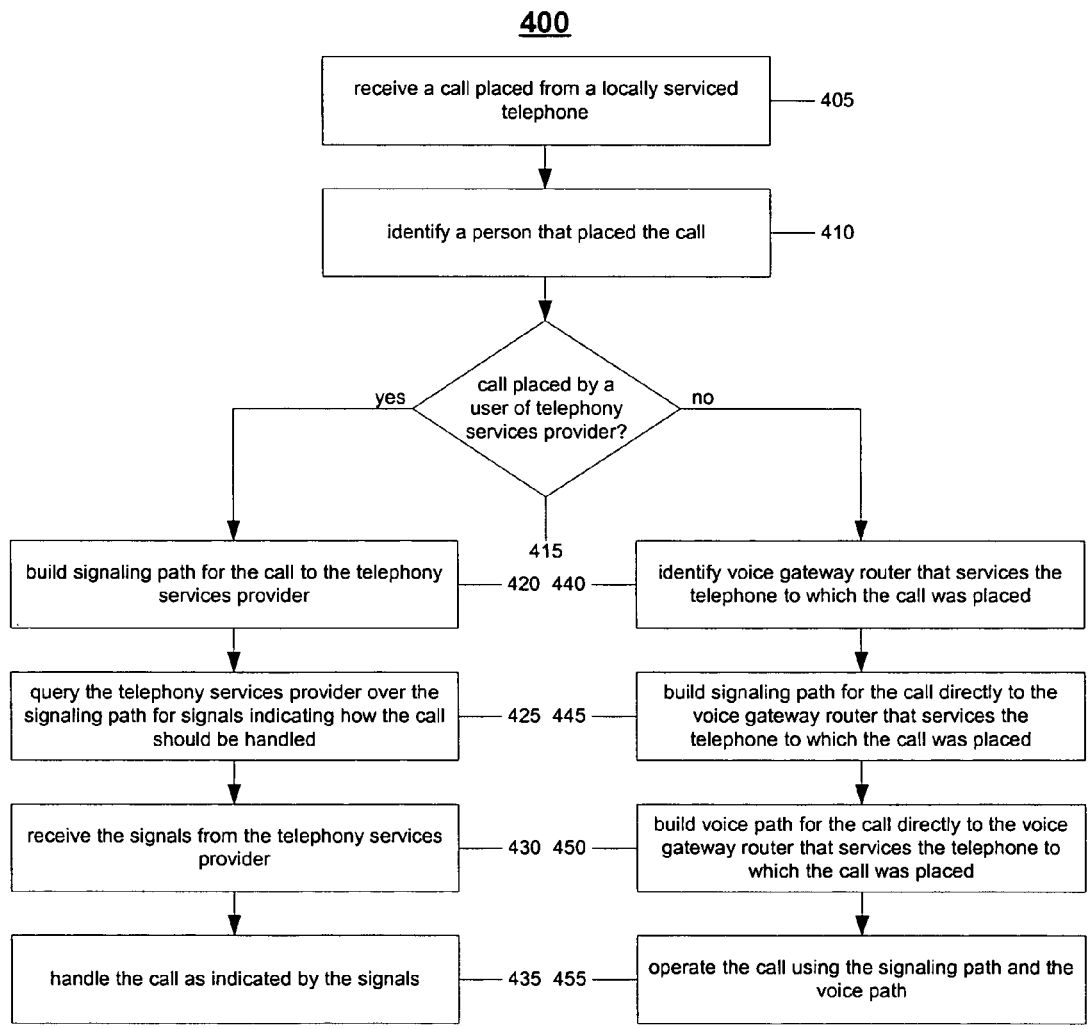
FIG. 4 is a flow chart of a process for retrieving control signals for application to a telephone call.

Referring to FIG. 4, a process 400 is used to retrieve signals for controlling a call. The process 400 may be executed by a voice gateway router of a telephony infrastructure provider, such as one of the voice gateway routers 125*a* and 125*b* of FIG. 1. When a query is to be handled by a telephony services provider, such as the telephony services provider 115 of FIG. 1, the voice gateway router retrieves signals for controlling the call from the telephony services provider. Otherwise, the call is handled normally without retrieving signals from the telephony services provider.

The voice gateway router first receives a call from a locally serviced telephone (405). The call may be received directly from the telephone, or from a delivery system that connects the telephone to the voice gateway router, such as one of the delivery systems 160*a* and 160*b* of FIG. 1. The voice gateway router identifies a person that placed the call (410). The voice gateway router may identify people involved in the call, based on, for example, phone numbers or IP addresses of the locally serviced telephone from which the call was placed.

The voice gateway router determines whether the call was placed by a user of the telephony services provider (415). In other words, the voice gateway router determines whether the person that placed the call is a person whose calls are controlled by the telephony services provider. The voice gateway router may make such a determination by searching for an indication of the person that placed the call in a local user database, such as one of the user databases 130*a* and 130*b* of FIG. 1. If an indication of the person is found in the user database, then the person is a user of the telephony services provider. Otherwise, the person is not a user of the telephony services provider.

If the person is a user of the telephony services provider, then the voice gateway router builds a signaling path to the telephony services provider (420). The voice gateway router may know the location of the telephony services provider and, consequently, may be able to build the signaling path directly to the telephony services provider. The voice gateway router queries the telephony services provider over the signaling path for signals indicating how the call should be handled (425). The voice gateway router may query the telephony services provider for the signals by providing an indication of the call to the telephony services provider over the signaling path.

In response to the query, the telephony services provider identifies the signals, as described above with respect to FIG. 3. The telephony services provider sends the identified signals to the voice gateway router, and the voice gateway router receives the signals (430). The voice gateway router then handles the call as indicated by the received signals (435). More particularly, the voice gateway router executes the received signals such that the call is handled in a manner identified by the telephony services provider.

If the person is not a user of the telephony services provider (415), then the voice gateway router handles the call normally without involving the telephony services provider. More particularly, the voice gateway router identifies a voice gateway router that services the telephone to which the call was placed (440). The voice gateway router may identify the voice gateway router that services the telephone to which the call was placed based on characteristics of the telephone. For example, the voice gateway router first may identify a phone number or a location to which the call was placed from the indication of the call received from the locally serviced telephone. The voice gateway router then may identify the corresponding voice gateway router based on the identified phone number or location.

The voice gateway router then builds a signaling path for the call directly to the voice gateway router that services the telephone to which the call was placed (445), and also builds a voice path for the call directly to the same voice gateway router (450). The voice gateway router, in conjunction with the voice gateway router that services the telephone to which the call was placed, operates the call using the signaling path and the voice path (455). The voice gateway routers may use mappings, such as the mappings 135*a* and 135*b* of FIG. 1, to route signals and voice data to the endpoints of the call. As a result, the call is handled normally without involving the telephony services provider.

The illustrated implementation of the process 400 is executed by a first voice gateway router that services a telephone that placed the call. A similar process may be executed by a second voice gateway router that services a telephone to which the call was placed. In general, the similar process is the same as the illustrated implementation of the process 400. More particularly, the second voice gateway router may receive an indication of the call from the first voice gateway router or from the telephony services provider instead of from the telephone from which the call was placed (405). Instead of identifying a person that placed the call, the second voice gateway router may identify a person to which the call was placed (410).

However, the second voice gateway router may execute the similar process only when the first gateway router does not execute the process 400. If special call handling is to be applied for both the person that placed the call and the person to which the call was placed, control signals for handling the call for the caller are identified first, and control signals for handling the call for the recipient are identified second. The control signals for handling the call for the second user are identified such that those control signals do not conflict with the control signals identified for the caller.

Figure 5:
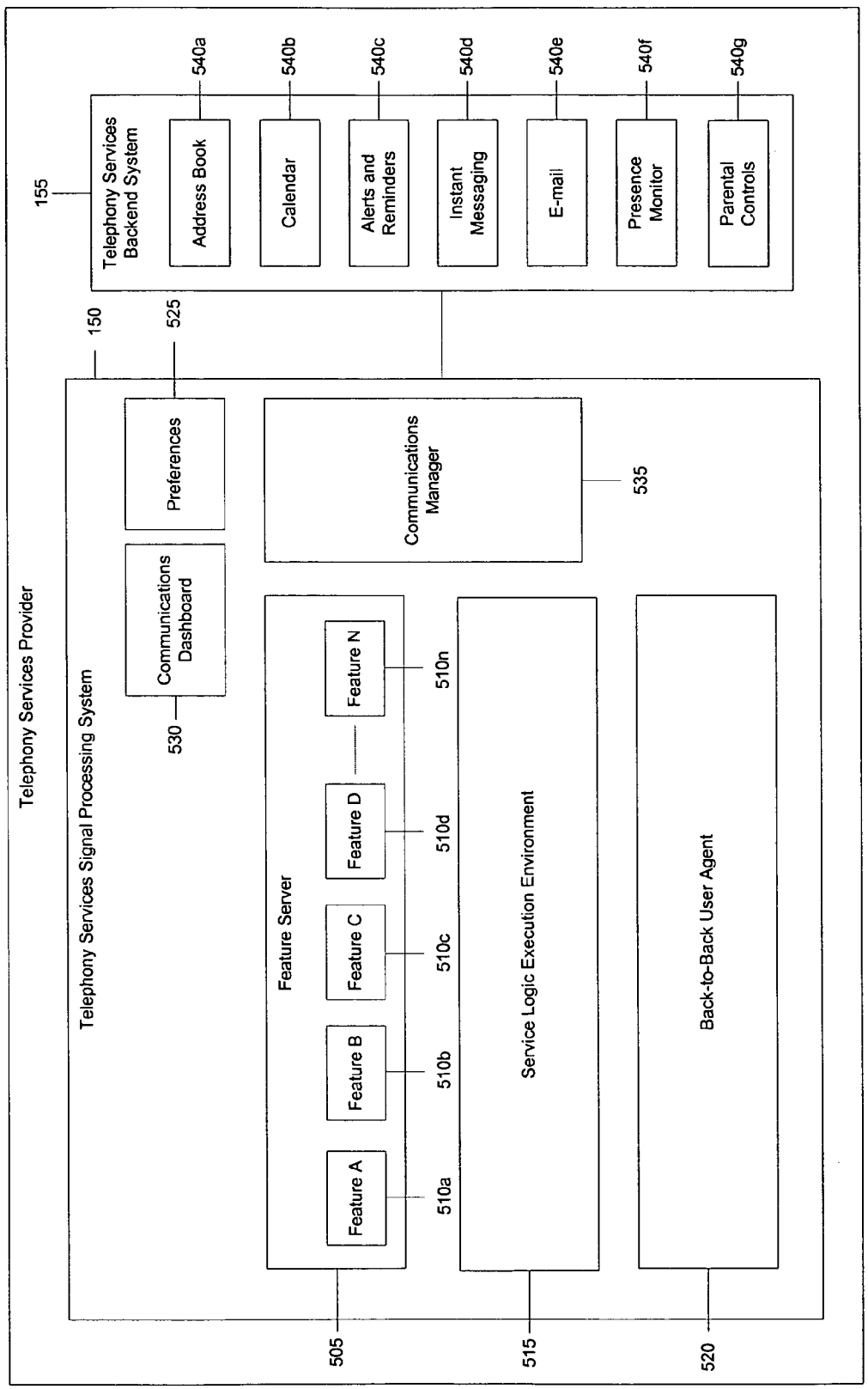
FIG. 5 is a block diagram of a telephony services provider that provides services for controlling telephone calls.

Referring to FIG. 5, one implementation of the telephony services provider 115 of FIG. 1 includes a telephony services signal processing system 150 and a telephony services back-end system 155. The telephony services signal processing system 150 includes a feature server 505 that includes features 510a-510n, a service logic execution environment 515, a back-to-back user agent 520, call handling preferences 525, a communications dashboard 530, and a communications manager 535. The telephony services back-end system includes various information sources 540a-540g that include an address book 540a, a calendar 540b, an alerts and reminders information source 540c, an instant messaging information source 540d, an e-mail information source 540e, a presence monitor 540f, and a parental controls information source 540g.

The feature server 505 manages the features 510a-510n. Each of the features 510a-510n represents an application that may be executed to identify signals for controlling a call in a particular manner. For example, the feature 510a may cause e-mail messages sent to a participant of the call to be read to the participant during the call. The feature 510b may provide to the participant reminders of calendar events from an electronic calendar maintained by the participant, or of tasks to be performed by the participant. The feature 510c may provide news updates, stock quotes, weather reports, or other information to a participant of the call. Such a feature may signal for information to be presented to the user such that other participants in the call may not perceive the information. In addition, the feature 510d may cause ring tones or other call announcements that are specific to participants in a call to be provided to the participants when the calls are received. The feature 510e may allocate charges to a person that placed a call when a recipient of the call indicates that the call is undesirable.

Other features may cause the call to be delivered to an intended recipient of the call. The call may be made to ring busy for a participant that placed the call. Alternatively or additionally, the call may be forwarded to a system that is different than a system to which the call was to be routed originally, such as a voicemail system. A call may be blocked such that an intended recipient of the call does not receive the call. An alert of the call, such as a ring tone, another pre-recorded audio message, or a visual alert of the call, may be presented to one or more participants of the call. An identification of a participant that placed the call may be presented to other participants of the call before the call is completed. An incoming call notification may be delivered to an intended recipient when the intended recipient is occupied with an ongoing but different call, and the intended recipient may be enabled to interrupt the ongoing call to handle the incoming call.

The feature server 505 may identify one or more of the features 510a-510n that may be executed to control a call. The feature server 505 provides the identified features to the service logic execution environment 515, which is a generic execution environment in which any of the features 510a-510n may be executed. For example, the service logic execution environment 515 may define an API of supported functions, and the features 510a-510n may be implemented using the API.

The execution of one or more of the features 510a-510n in the service logic execution environment 515 results in the identification of one or more call handling signals that are passed to the back-to-back user agent 520. The back-to-back user agent 520 is an interface of the telephony services provider 115 to a telephony infrastructure provider that operates calls that are controlled by the telephony services provider 115. Signaling paths that are built from the telephony infrastructure provider to the telephony services provider are built to the back-to-back user agent 520. As a result, indications of calls for which control signals are to be identified are received from the telephony infrastructure provider by the back-to-back user agent 520. In addition, the control signals are sent to the telephony infrastructure provider from the back-to-back user agent 520.

The call handling preferences 525 identify one or more of the features 510a-510n to be applied to a call. More particularly, the feature server 505 may use the call handling preferences 525 when identifying which of the features 510a-510n to apply to a call. The call handling preferences 525 may identify conditions that must be satisfied for a particular feature to be applied to the call. The conditions may reference information that may be accessed from the telephony services back-end system 155. The call handling preferences 525 may include conditions for each user whose calls are controlled by the telephony services provider 115. The communications dashboard 530 enables a user whose calls are controlled by the telephony services provider 115, or a supervisor or a guardian of the user, to specify personal call handling preferences. More particularly, the communications dashboard 530 is a user interface that may be accessed by the user to specify the personal call handling preferences. In one implementation, the dashboard 530 may include a program running on a server that can serve web pages to a user accessing the dashboard from a web browser. The communications dashboard 530 also may be used to view information provided by the telephony services back-end system 155.

The communications manager 535 is an interface between the telephony services signal processing system 150 and the telephony services back-end system 155. More particularly, the communications manager 535 may provide an API with which other components of the telephony services signal processing system 150 may request and receive information from the telephony services back-end system 155. In one implementation, the communications manager 535 also may be used by the feature server 505 and the service logic execution environment to access the call handling preferences 525. In one implementation, the communications manager 535 may include a cache of information from information sources 540a-540g such that commonly needed information does not need to be accessed repeatedly from the information sources 540a-540g.

The telephony services back-end system 155 includes information sources 540a-540g that provide information that may be used when identifying one or more of the features 510a-510n for application to a call, or when executing the identified features. The information provided by the information sources 540a-540g may be maintained by the telephony services back-end system 155, or by one or more external systems corresponding to the information sources 540a-540g. For example, information provided by the e-mail information source 540d may be maintained by an e-mail system that is external to the telephony services provider 115.

Each of the information sources 540a-540g may include information that corresponds to each of the users whose calls are controlled by the telephony services provider 115. The information sources 540a-540g are described below with respect to a single user, though each of the information sources 540a-540g typically corresponds to multiple users.

The address book 540a includes contact information of people known to the user. The address book 540a may be used to determine if a person or opposite party participating in a call for which control signals are being identified is known to the user. In particular, if contact information for the person is found in the address book, then the person may be assumed to be known by the user. A feature may be applied to the call depending on whether the person is known to the user. For example, a feature for providing contact information for the user may be applied to the call only when the user communicates with a known person in the call. Furthermore, execution of a feature may require a determination of whether another person participating in a call is known to the user. For example, a feature for providing an alert to the user may require a determination of whether the other participant is known such that the alert may be presented only to the user when the participant is not known, and to both the user and the other participant when the participant is known.

The calendar 540b includes indications of events in which the user is to participate. A feature may be applied to a call when the user is participating in a particular type of event from the calendar 540b. For example, a feature for providing news alerts to the user over a telephone used by the user may be applied to the call because the user is participating in the call as part of an event indicated by the calendar 540b. In addition, execution of a feature may require accessing a description of an event in which the user is participating such that signals for presenting the description to the user may be identified. For example, a feature for providing alerts of events to the user may access a description of the event such that the description may be provided to the user. The events indicated by the calendar 540b may indicate the availability of the user, for example, to place and receive calls. For example, the user may be unavailable when participating in one of the events, and may be available otherwise. The alerts and reminders information source 540c may include similar indications of events and tasks in which the user is to participate.

The instant messaging information source 540d and the e-mail information source 540e both include information describing instant messages and e-mail messages sent and received by the user. Signals for presenting instant messages and e-mail messages to the user may be identified by one of the features 510a-510n, but the call handling preferences 525 may indicate that such a feature is only to be executed when the information sources 540d and 540e include messages that have not been presented to the user already. For example, if a new e-mail message or a new instant message for the user is received while the user is participating in the call, then an indication of the new message, such as a sender, subject, or a time of receipt of the message, may be presented to the user. In response to the indication, the user may signal for the message to be read. Appropriate signals for reading the message to the user such the message is not read to other participants of the call do not hear the message may be identified.

The presence monitor 504f indicates a current activity of the user. For example, the presence monitor 540f may indicate whether the user is communicating with one or more other entities using a telephone, instant messages, or e-mail messages, or participating in an event from an electronic calendar of the user. The call handling preferences 525 may indicate that one or more of the features 510a-510n be selected for execution if the user is using the telephone. For example, if the presence monitor 504f indicates that the user is communicating using a telephone and instant messages, a feature for presenting new instant messages to the user on the telephone may be selected for execution.

In addition, the signals identified through execution of one of the features 510a-510n may depend on an activity of the user. For example, a feature for determining whether the user may or may not participate in a call based on an activity of the user may identify signals for blocking or allowing the call, depending on the activity of the user. For example, the user may be available to participate in the call when participating in particular activities, and signals for allowing the user to participate in the call may be identified when the presence monitor 504f indicates that the user is participating in one of the particular activities. Furthermore, the user may not be available to participate in the call when participating in other activities, and signals for blocking the call may be identified when the presence monitor 504f indicates that the user is participating in one of the other activities. In other words, the current activity identified by the presence monitor 504f may indicate the availability of user to place and receive telephone calls.

The parental controls information source 540g includes information describing parental controls the telephone use of the user. For example, the parental controls information source 540g may include an indication of an amount of time during a period for which the user has communicated using a telephone, as well as an indication of a maximum amount of time during the period for which the user may communicate using the telephone. The parental controls information source 540g also may include indications of times when the user may participate in telephone calls, and times when the user may not participate in telephone calls. The parental controls information source 540g also may include indications of people to or from whom calls are blocked.

The call handling preferences 525 may indicate that one or more of the features 510a-510n be selected for application to a call based in information included in the parental controls information source 540g. For example, if the parental controls information source 540g indicates that the present time is a time at which the user may not participate in the call, then the a feature for notifying other participants in the call that the user may not participate in the call may be selected for execution. As another example, if the parental controls information source 540g indicates that one or more other participants in the call are people to or from whom calls are blocked, then a feature for blocking the call may be selected for execution.

In addition, the signals identified through execution of one of the features 510a-510n may depend on the information included in the parental controls information source 540g. For example, a feature for blocking or allowing a call may identify signals for allowing the call when the user has not communicated for longer than the maximum allowable amount of time during the time period. In addition, the feature may identify signals for blocking the call when the user has communicated for at least the maximum allowable amount of time during the time period. Furthermore, the feature may identify signals for allowing the call when the other participants in the call are people whose calls are allowed, and signals for blocking the call when the one or more of the other participants in the call are people whose calls are blocked.

Information included in the telephony services back-end system 155 may be updated as a result of the execution of one or more of the features 510a-510n. For example, when a feature for allowing the user to participate in a call is executed, information included in the presence monitor 504f may be updated to indicate that the user currently is participating in the call. In general, the information may be updated to include an indication of availability of the first call participant to place and receive a call, an activity undertaken by the first call participant, a time at which the first call participant may or may not place or receive a call, a person with which the first call participant may or may not participate in a call, an amount of time for which the first call participant has participated in calls, a call handling preference, or a parental control.

The updated information may be used to identify control signals for future calls. For example, if a subsequent call for the user is received while the user still is participating in the original call, control signals for providing a notification of the subsequent call to the user in a manner that does not interfere with the user's participation in the original call may be identified. Such control signals may be identified based on the updated information included in the presence monitor 504f, which indicates that the user is participating in the original call.

The information included in the telephony services back-end system 155 and the preferences 525 that applies to the user may be specified by the user, or by a guardian or supervisor of the user, such as a parent or an employer of the user. For example, the user or the guardian or supervisor of the user may be presented a graphical user interface that may be used to specify the information. The user, or the guardian or supervisor of the user, may specify the information by accessing the telephony services back-end system 155 directly, or by accessing one or more of the external systems that correspond to the information sources 540a-540g. For example, the user may specify the information included in the address book 540a with an external communications system, such as an e-mail system. The information is specified prior to being used to identify control signals for a call.

Figure 6:
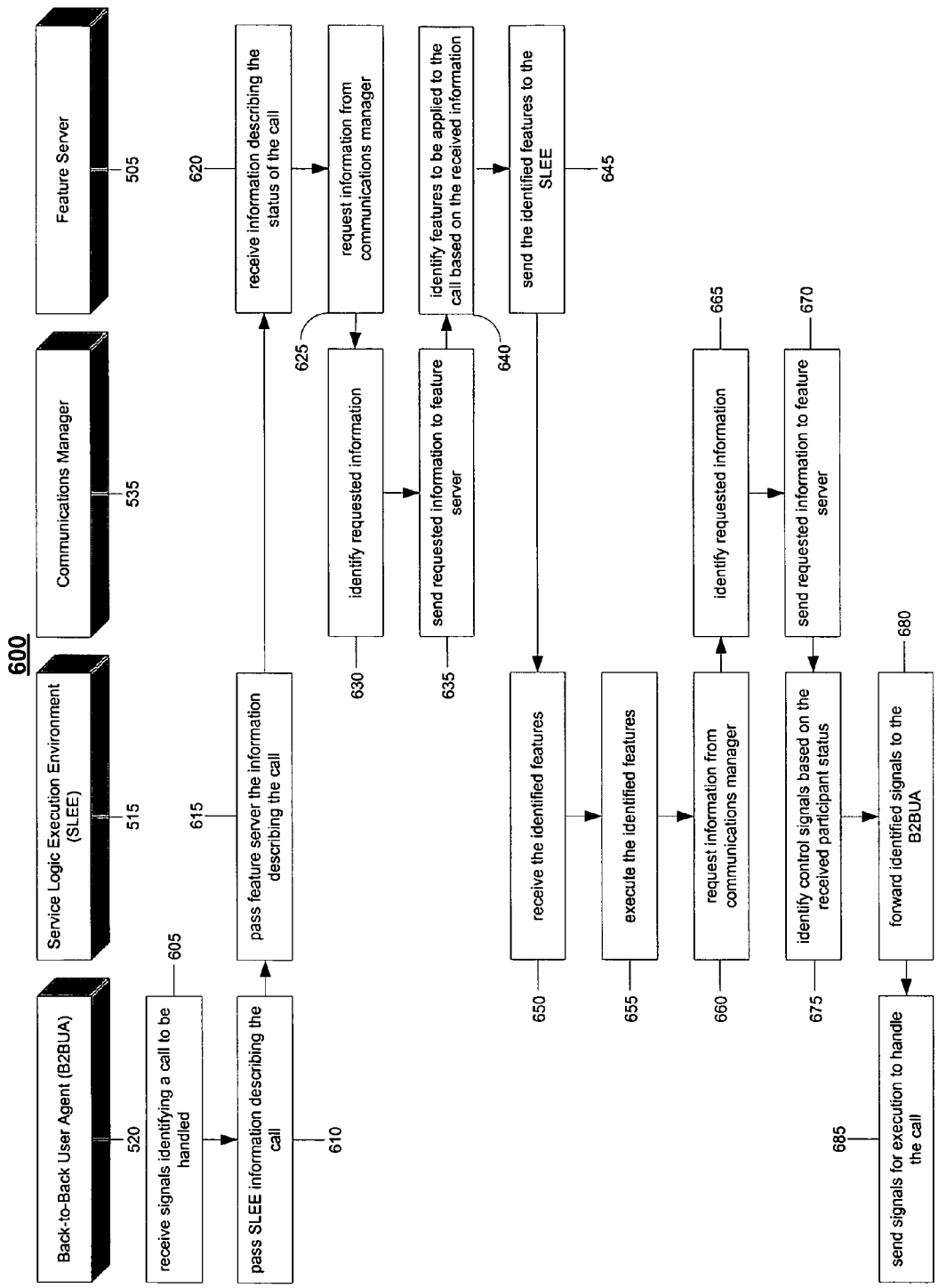
FIG. 6 is a flow chart of a process for identifying control signals for a telephone call using the telephony services provider of FIG. 5.

Referring to FIG. 6, a process 600 is executed by the telephony services provider 115 of FIG. 5 to identify control signals for handling a call that involves a user of the telephony services provider 115. The process 600 includes multiple components of the telephony services provider 115, such as the back-to-back user agent (B2BUA) 520, the service logic execution environment (SLEE) 515, the communications manager 535, and the feature server 505.

The process begins when the B2BUA 520 receives signals identifying a call to be handled (605). The signals are received over a signaling path that has been established to the B2BUA 520 by a telephony infrastructure provider that is operating the call. The telephony infrastructure provider may send the signals identifying the call to the B2BUA 520 because the telephony infrastructure provider determined that the call should be handled by the telephony services provider 115. The B2BUA 520 passes information describing the call to the SLEE 515 (610). The SLEE 515 passes the information to the feature server 505 (615), and the feature server 505 receives the information (620). The information may include telephone numbers to and from which the call was placed, identifiers of people participating in the call, and a time at which the call was placed.

The feature server 505 requests information from the communications manager 535 (625). More particularly, the feature server 505 requests information that may be used when identifying which of one or more included features, such as the features 510a-510n of FIG. 5, should be applied to the call. The requested information may include call handling preferences for one or more of the participants in the call.

The communications manager 535 identifies the requested information (630), for example from the telephony services back-end system 155, and then sends the requested information to the feature server 505 (635). Using the received information, the feature server 505 identifies one or more of the included features to be applied to the call (640). For example, the call handling preferences may indicate that a particular feature should be applied for one of the participants in the call, so the feature server 505 may identify the particular feature as one of the features to be applied to the call.

The feature server 505 sends the identified features to the SLEE 515 for execution (645), and the SLEE 515 receives the features (650). The SLEE 515 executes the received features to identify control signals for handling the call (655). Execution of one or more of the features may require information from the telephony services back-end system 155, and the SLEE 515 requests that information from the communications manager 535 (660). The communications manager 535 identifies the requested information from the telephony services back-end system 155 (665) and sends the requested information to the SLEE 515 (670).

The SLEE 515 continues to execute the features that were sent by the feature server 505 using the information received from the communications manager, and identifies control signals for handling the call (675). The SLEE 515 forwards the identified signals to the B2BUA 520 (680). The B2BUA 520 may validate the signals received from the SLEE 515 to verify that the signals will result in allowable handling of the call. The B2BUA 520 sends the signals for execution to handle the call (685). More particularly, the B2BUA 520 sends the signals over the signaling path on which the signals identifying the call were received. The telephony infrastructure provider receives and executes the signals to handle the call as indicated by the features that were executed.

Figure 7:
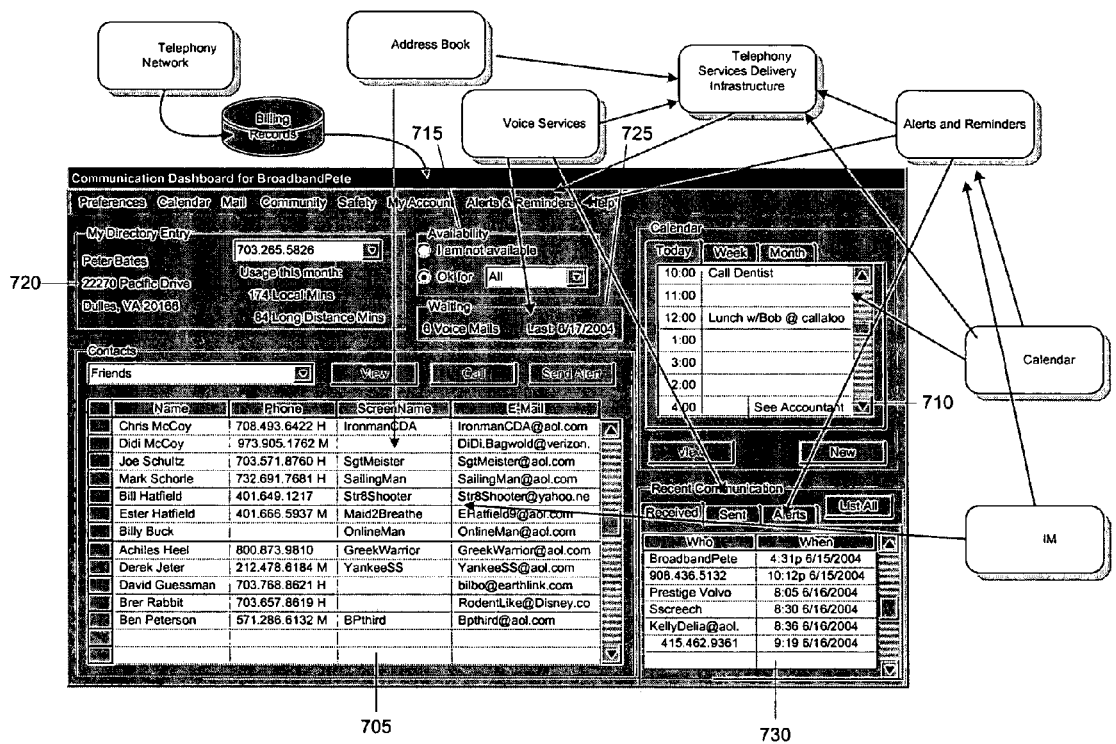
FIG. 7 is an illustration of an interface for presenting information related to call handling services.

Referring to FIG. 7, one implementation of the communications dashboard 530 of FIG. 5 enables a user to view information used when identifying signals for controlling telephone calls involving the user. The communications dashboard 530 includes multiple sections 705-730, including a contact list 705, a calendar 710, an availability indicator 715, a contact information indicator 720, a voice mail indicator 725, and a recent communications indicator 730. Interaction with the communications dashboard 530 may add or modify information to the call handling preferences 525 and the telephony services back-end system 155 of FIG. 5.

The contact list 705 includes contact information for people known to a user for which the communications dashboard 535 is presented. The information included in the contact list 705 may be taken from one or more external sources, such as an address book of an e-mail system or a buddy list of an instant messaging system. In one implementation, one of the entries of the contact list 705 may be selected and an additional interface may be presented for specifying call handling preferences for calls to or from a person corresponding to the entry. For example, the additional interface may enable the specification of a ring tone for calls from the person.

The calendar 710 includes events from an electronic calendar of the user that may be retrieved from an external system that maintains the electronic calendar. Similarly to the contact list 705, one of the events may be selected to display an additional interface for specifying call handling preferences related to the event. For example, the additional interface may enable the specification of whether an alert for the selected event will be presented to the user, and, if so, the type of alert to be presented to the user.

The availability indicator 715 indicates the availability of the user to participate in telephone calls. The user may specify an availability with the availability indicator 715 to override other automatic determinations of the availability of the user that may be made. The specified availability may indicate one or more call handling applications or features to be applied to calls to the user, such as the features 510a-510n of FIG. 1. The specified availability also may affect the control signals that are identified with the one or more call handling applications.

The contact information indicator 720 includes contact information for the user. The voice mail indicator 725 indicates whether or not new voicemails for the user have been received. In one implementation, the information presented by the contact information indicator 720 and the voicemail indicator 725 does not affect how calls to the user are handled. In other implementations, the information presented by the indicators 720 and 725 may be used to identify and to affect the execution of the one or more call handling applications. For example, a call handling application may be identified for execution only when a new voicemail has been received for the user.

The recent communications list 730 identifies recent communications of the user. The recent communications may include telephone calls, instant messages, and e-mail messages. The recent communications list 730 may include indications of how the recent communications were handled. Such indications may be used to identify how future communications are to be handled. For example, future communications may be handled in the same manner as the recent communications, such that the applications for handling the future communications may be identified based on the indications of how the recent communications were handled.

Figure 7A:
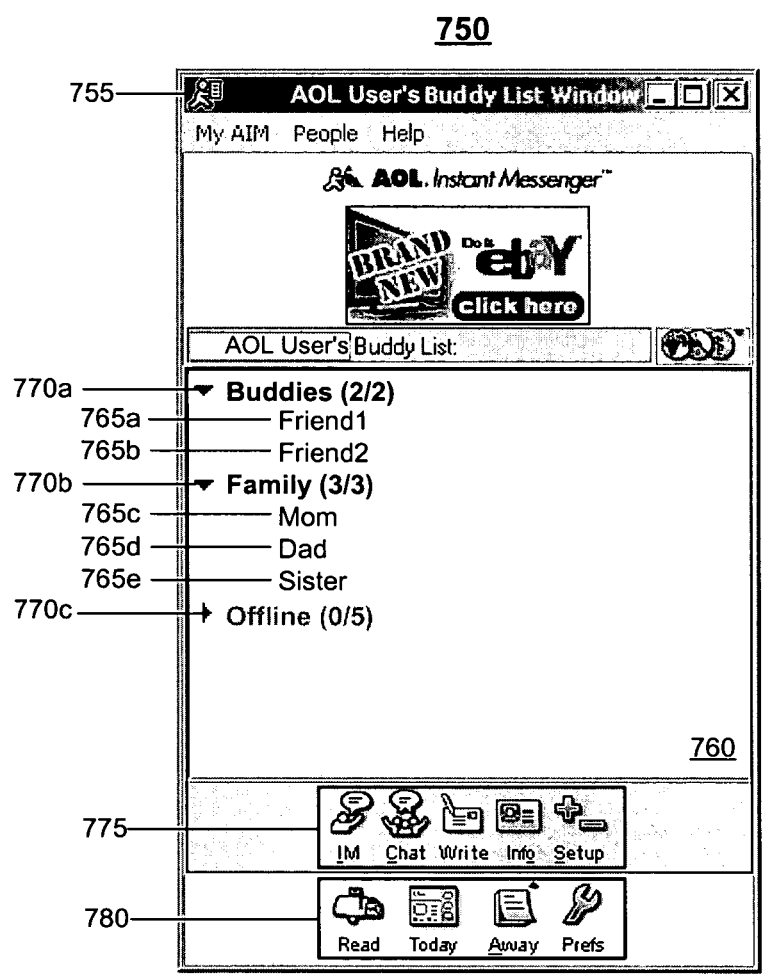
FIG. 7A is an illustration of an interface for presenting a list of users of an instant messaging system for which presence information is maintained.

Referring to FIG. 7A, a participant list interface 750 for a given user displays the identifiers of other selected users of an instant messaging system with which the given user regularly communicates. The other selected users form a participant list for the given user. Communications with one of the other selected users may be initiated through selection of the corresponding identifier for the other user from the participant list. The other users may have been added to the participant list by the given user manually using identifiers of the other users in the instant messaging system that are known to the given user at the time of addition.

The participant list interface 750 includes a text box 760 that contains the participant list for the given user, who is identified by an identifier "AOLUser," as indicated in the title bar 755 of the participant list interface 750. The participant list in the participant list interface 750 includes multiple identifiers 765a-765e. More particularly, the participant list includes the identifier "Friend1" 765a, the identifier "Friend2" 765b, the identifier "Mom" 765c, the identifier "Dad" 765d, and the identifier "Sister" 765e.

The identifiers within the participant list shown by participant list interface 750 are organized into multiple groups 770a-770c. Each identifier within the participant list is associated with at least one of the groups 770a-770c. The participant list includes a "Buddies" group 770a, a "Family" group 770b, and an "Offline" group 770c. The identifier 765a appears below the heading for the group 770a because the identifier 765a has been associated with the group 770a and the corresponding user is present, that is, logged into the instant messaging system and available to send and receive instant messages. The heading for each of the groups 770a and 770b indicates the number of buddies in the group currently logged into the instant messaging system, as well as the total number of buddies in the group. For example, two out of the two members of the group 770a are logged into the instant messaging system for which the participant list interface 750 is displayed. Similarly, the heading for the "Offline" group 770c indicates the number of other users on the participant list that are not logged into the system (i.e., 0) and the total number of buddies on the participant list (i.e., 5). Typically, when users log into the instant messaging system, identifiers of the users are moved from the "Offline" group 770c to one of the other groups 770a or 770b.

The participant list interface 750 also includes controls 775 that enable the given user to communicate with the other selected users corresponding to the identifiers 765a-765e. For example, the given user may send instant messages, chat invitations, or e-mail messages to the communications identities referenced in the participant list through use of the controls 775. The controls 775 also enable the user to obtain information describing the other users, as well as to modify the set of other users referenced in the participant list interface 750. The participant list interface 750 also includes controls 780 that enable the given user to access other information not directly related to sending and receiving instant messages. For example, the given user may use the controls to access e-mail messages or other special features of the instant messaging system. The given user also may use the controls 780 to modify preferences for the participant list interface 750.

Figure 8:
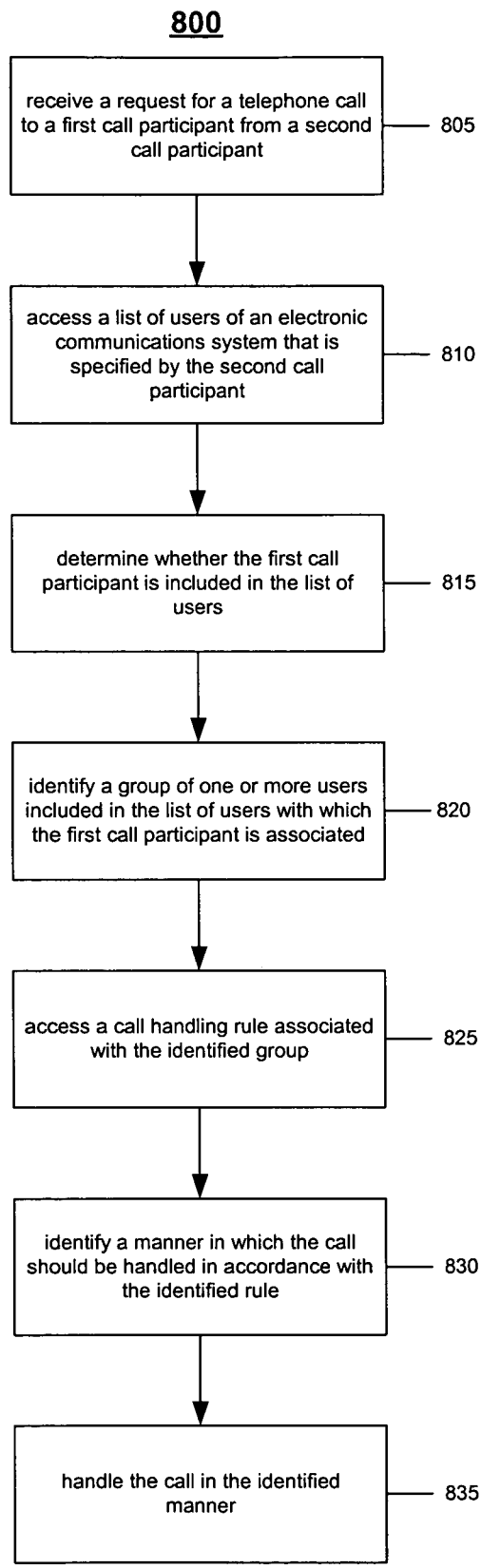
FIG. 8 is a flow chart of a process for handling a call based on a rule associated with one or more users included in a list of users for an electronic communications system.

Referring to FIG. 8, a process 800 is used to identify signals for controlling a received call. The process 800 may be executed by a telephony services signal processing system of a telephony services provider, such as the telephony services signal processing system 150 of FIG. 1. The telephony services signal processing system identifies the signals based on one or more call handling rules that have been specified for one of the participants in the call. Specifically, the rules are associated with groups of one or more users within a list of users of an electronic communications system that is used by one of the call participants. The rules that are applied to the call are the rules that are associated with a group of the list of users that includes at least one of the call participants.

The telephony services signal processing system receives a request for a telephone call to a first call participant from a second call participant (805). The request for the call may be received from a voice gateway router that services the first call participant or the second call participant. More particularly, the request for the call is received from a voice gateway router that services a telephone that is used by the first call participant or the second call participant, such as one of the voice gateway routers 125a and 125b of FIG. 1. The request for the call may be received over a signaling path that has been established between the voice gateway router and the telephony services signal processing system, such as one of the signaling paths 145a and 145b of FIG. 1.

The telephony services signal processing system accesses a list of users of an electronic communications system that is specified by the second call participant (810). The telephony services signal processing system may access the list from a backend system that is accessible to the telephony services signal processing system, such as the telephony services backend system 155 of FIG. 1. In one implementation, the list of users is a list of users of an instant messaging system for whom online presence information is monitored. In another implementation, the list of users is an address book of an e-mail system.

The telephony services signal processing system determines whether the first call participant is included in the accessed list of users (815). For example, the telephony services signal processing system may determine whether an identifier of the first call participant is included in the accessed list. If the first call participant is included in the list, then the telephony services signal processing system identifies a group of one or more users included in the list with which the first call participant is associated (820).

The telephony services signal processing system accesses a call handling rule associated with the identified group (825). The call handling rule may be accessed from the backend system. The call handling rule may have been specified by the second call participant and associated with at least the first call participant in the list of users before the request for the call was received. The second call participant may perform such a specification and association of the rule using the communications dashboard 530 of FIGS. 5 and 7. Alternatively or additionally, the second call participant may perform the specification and association of the rule using the participant list interface 750 of FIG. 7A Alternatively or additionally, the call handling rule may have been specified by a supervisor of the second call participant, such as an employer or a parent of the second call participant.

The telephony services signal processing system identifies a manner in which the call should be handled in accordance with the identified rule (830). In one implementation, the telephony services signal processing system identifies call handling signals that, when executed by the voice gateway routers that service the first and second call participants, result in the call being handled in the identified manner.

The identified rule may indicate one or more pieces of information that are accessible from the backend system to be considered when identifying the manner in which the call should be handled. The information may include an indication of an availability of the first call participant or the second call participant to participate in the call. The availability of the first or second call participant may be indicated by an event from an electronic calendar of the first call participant or the second call participant. The information also may include an indication of the online presence of the first call participant or the second call participant, an importance of the call, or a characteristic of the first call participant or the second call participant. The characteristic of the first or second call participant may be indicated by a profile of the first or second call participant, or other electronic content describing the first and or second call participant. The characteristic may be an age, gender, occupation, location, or other characteristic of the first or second call participant.

The information indicated by the identified rule may specify a time period during which calls from a particular user or user group will be blocked or allowed, a cumulative amount of time that the first call participant may spend on telephone calls over a period of time in aggregate or with one user or user group, and/or the number of calls the first call participant may make and/or receive during a time period. As such, a time at which a call to the first call participant or from the second participant is to be blocked or allowed may be compared to a time at which the request for the call is received to indicate how the requested call should be handled. Similarly, a comparison of an, amount of time for which the first call participant or the second call participant has participated in telephone calls and a maximum allowable amount of time for which the first call participant or the second call participant may participate in telephone calls may indicate how the call should be handled. A comparison of a number of telephone calls in which the first call participant or the second call participant has participated and a maximum allowable number of telephone calls also may indicate how the call should be handled.

The people and phone numbers to or from which calls may or may not be received or placed may be indicated by a contact list maintained by the first or second call participant, such as an e-mail address book or a list of instant messaging users for which presence information is monitored for the user. Handling of the call may be affected by whether the first person is a person to whom the second call participant may or may not place telephone calls. In addition, whether a telephone number of the first call participant is a telephone number to which the second call participant may or may not place telephone calls may affect how the call is handled. Similarly, handling of the call may be affected by whether the second person is a person from whom the first call participant may or may not receive telephone calls. In addition, whether a telephone number of the second call participant is a telephone number from which the first call participant may or may not receive telephone calls may affect how the call is handled. Also, the location of the first and second call participants within the contact list (e.g., a group of the contact list that includes the first or second call participant) may affect how the call is handled.

Based on the accessed information and the rule, the telephony services signal processing system identifies the manner in which the call should be handled (830). For example, the telephony services signal processing system may identify that the call should be delivered to, or blocked from, the first call participant. In addition, the telephony services signal processing system may identify that the second call participant should be identified for the first call participant before the first call participant is enabled to answer the call. The telephony services signal processing system may identify a tone with which the call should ring for the first call participant. The telephony services signal processing system may identify that the call should ring busy for the second call participant. The call may be routed to a system different than a system to which the call was to be routed originally, such as a voicemail system. The telephony services signal processing system may identify an alert of the call to be presented to the first call participant. The telephony services signal processing system also may identify a pre-recorded audio message that is to be played for the first call participant or the second call participant.

The telephony services signal processing system handles the call in the identified manner (835). In one implementation, the telephony services signal processing system sends the identified call handling signals to the voice gateway routers that service the first and second call participants. The signals may be sent over signaling paths between the telephony services signal processing system and the voice gateway routers. The voice gateway routers execute the signals to control the call in the manner identified by the telephony services signal processing system. Executing the signals may cause a voice path over which the first and second call participants may communicate, such as the voice path 140 of FIG. 1, to be established between the voice gateway routers. Executing the control signals also may cause the voice path to be controlled in the identified manner in which the call should be handled.

Figure 9:
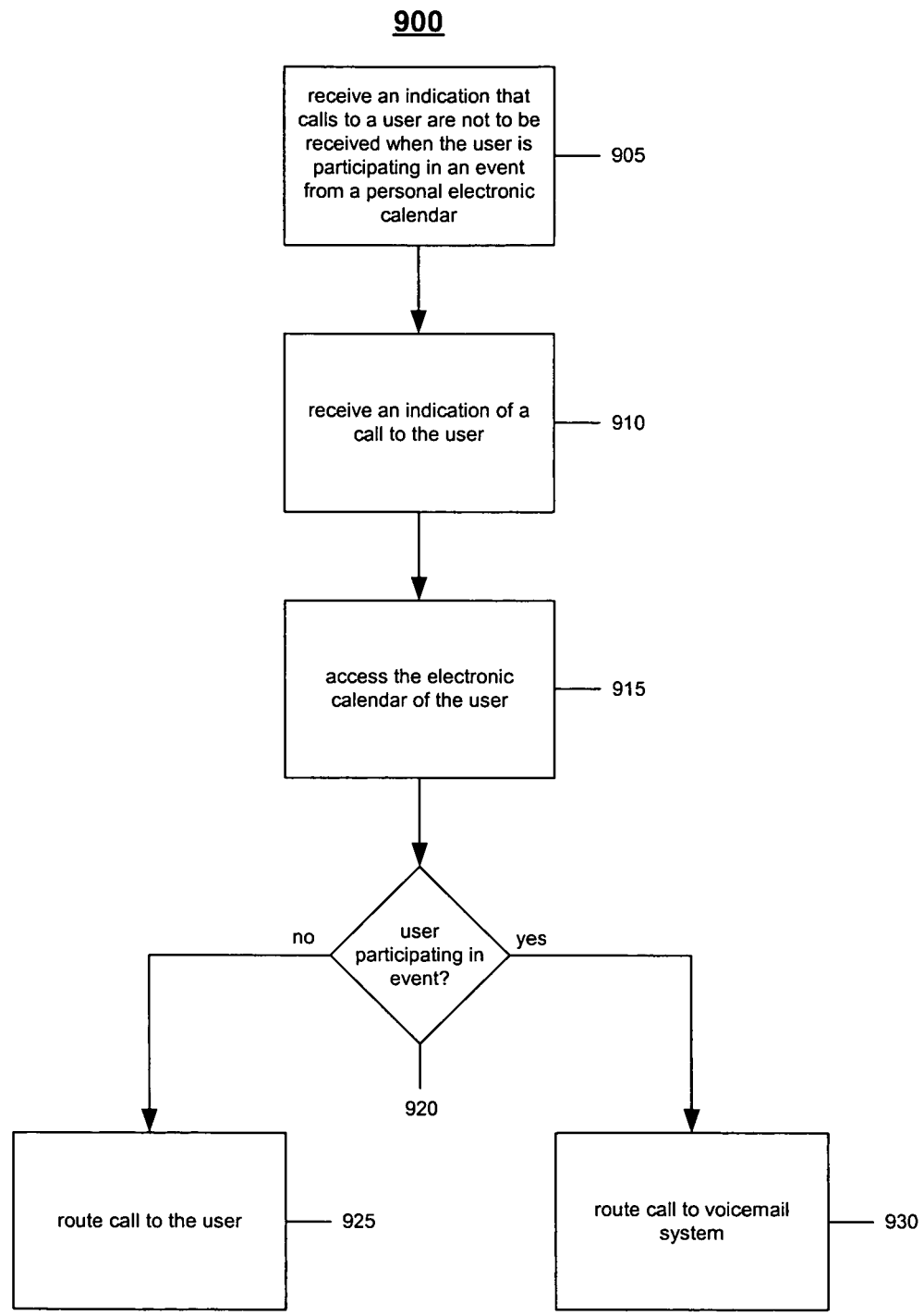
FIGS. 9-11 are flow charts of exemplary processes for handling a call based on one or more call handling rules.
Figure 10:
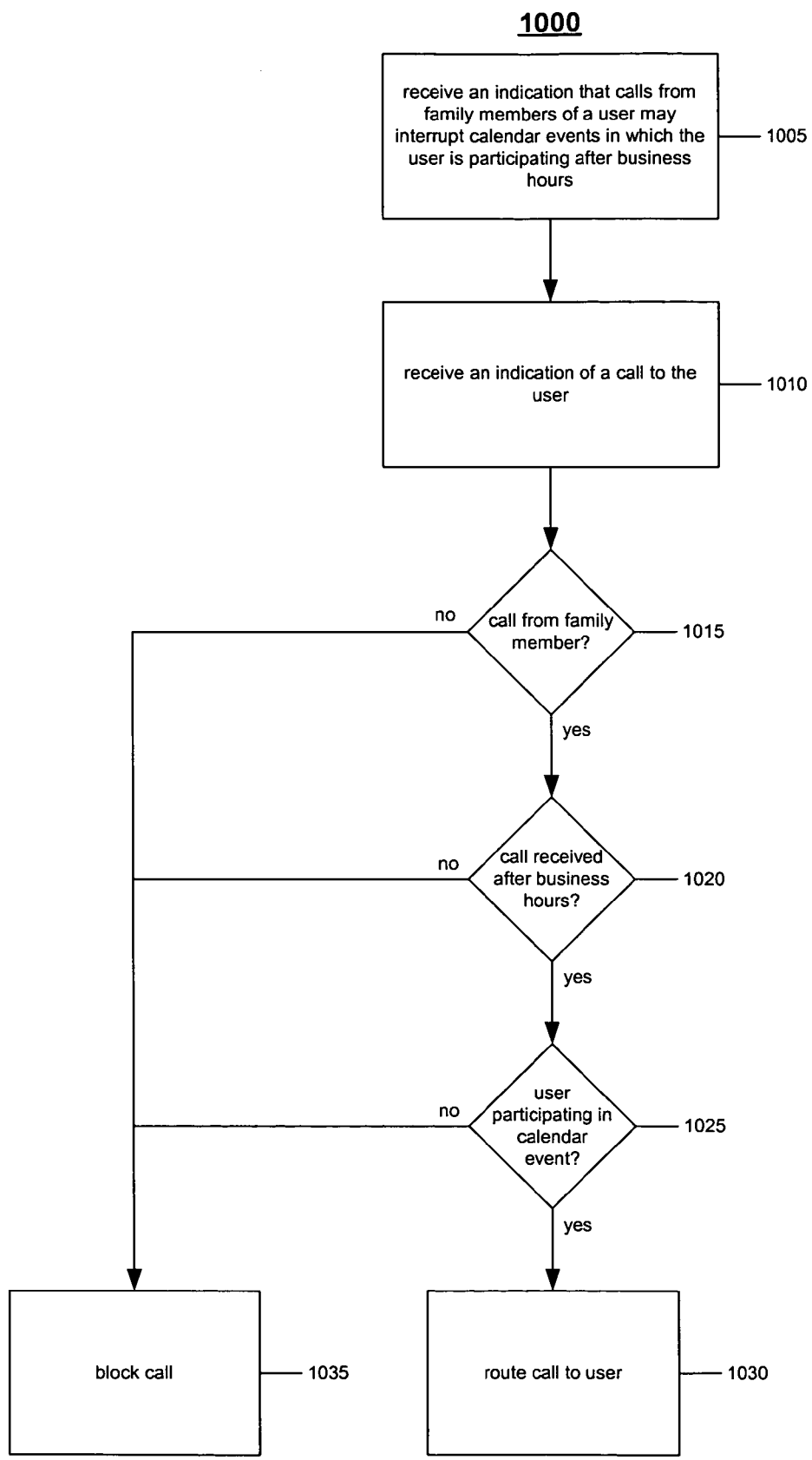
Figure 11:
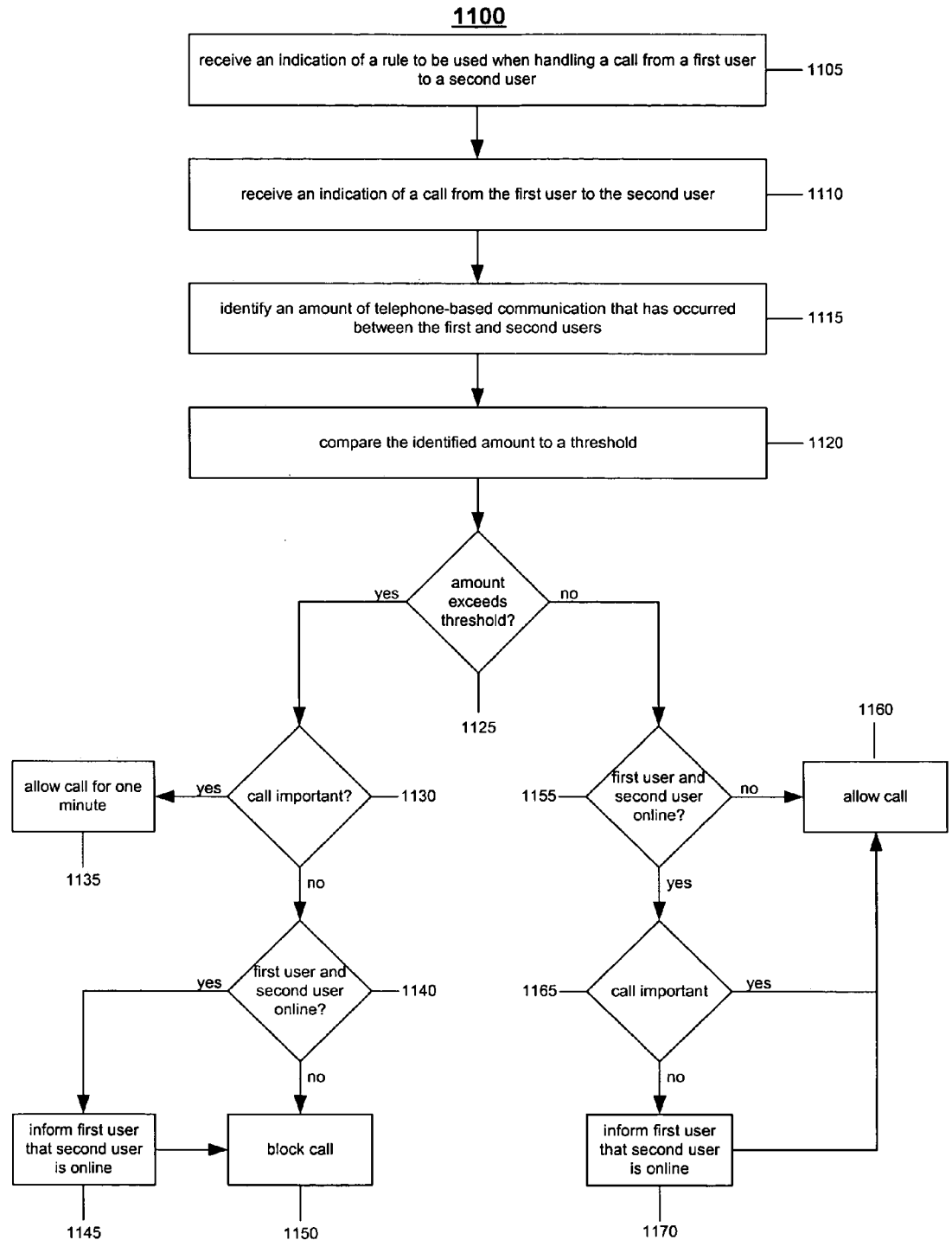

Referring to FIG. 9-11, exemplary processes 900, 1000, and 1100 are used to handle calls according to previously specified call handling rules. The processes 900, 1000, and 1100 may be executed by a telephony services signal processing system of a telephony services provider, such as the telephony services signal processing system 150 of FIG. 1. The telephony services signal processing system identifies signals that instruct a telephony infrastructure provider to handle the call in a manner that is consistent with one or more of the rules. The rules may consider information that is not accessible to the telephony infrastructure provider when indicating how the call should be handled.

In the process 900, a call is handled based on whether or not a recipient of the call is participating in an event from a personal electronic calendar when the call is received. The telephony services signal processing system receives an indication that calls to a user are not to be received when the user is participating in an event from a personal electronic calendar (905). The user may specify such a call handling rule and associate the rule with one or more people included in a list of users of an electronic communications system that is maintained by the user, and may do so in advance of a call to be handled.

The telephony services signal processing system receives an indication of a call to the user (910). The telephony services signal processing system identifies a caller that placed the call, and identifies the call handling rule as being associated with the caller in the list of users. The call handling rule indicates that the manner in which the call should be handled depends on the status of the user as reflected, e.g., by an electronic calendar of the user, so the telephony services signal processing system accesses the electronic calendar of the user (915). The electronic calendar may be accessed from a backend system that is accessible to the telephony services signal processing system, such as the telephony services backend system 155 of FIG. 1.

The telephony services signal processing system determines whether the user is participating in an event from the electronic calendar (920). If the user is not participating in an event from the electronic calendar, then the telephony services signal processing system routes the call to the user (925) or controls the call by applying rules that do not relate to the calendar. More particularly, the telephony services signal processing system identifies signals to instruct the telephony infrastructure provider to route the call to the user. If the user is participating in an event from the calendar (920), then the telephony services signal processing system prevents the call from being routed to the user. For example, the telephony services signal processing system may route the call to a voicemail system of the user (930). More particularly, the telephony services signal processing system may identify signals to instruct the telephony infrastructure provider to route the call to a voicemail system of the user. The identified signals are executed to handle the call in the identified manner.

In the process 1000 of FIG. 10, the telephony services signal processing system handles a call based on an identity of the caller, a time at which the call is received, and an electronic calendar event in which the call recipient is participating. The telephony services signal processing system receives a call handling rule that indicates that a call from family members of a user may interrupt calendar events in which the user is participating after business hours (1005).

The telephony services signal processing system receives an indication of a call to the user (1010). The telephony services signal processing system identifies the call handling rule as associated with a caller that placed the call. In order to determine how the call should be handled in accordance with the rule, the telephony services signal processing system determines whether the call is from a family member of the user (1015). The telephony services signal processing system also determines whether the call was received after business hours (1020), and/or whether the user is participating in an event from the user's electronic calendar (1025).

Such determinations may be based on information that is stored in a backend system that is accessible to the telephony services signal processing system, such as the telephony services backend system 155 of FIG. 1. For example, the telephony services signal processing system may determine whether the call is from a family member by determining whether an identifier of a caller that placed the call is included in a list of family members of the user that is stored on the backend system. Similarly, the telephony services signal processing system may determine if the call was received after business hours by comparing a time at which the call was received to a definition of business hours that is stored on the backend system for the user. The user's electronic calendar also may be accessed from the backend system.

If the call is from a family member and is received after business hours, and if the user is participating in the calendar event, then the telephony services signal processing system routes the call to the user (1030). More particularly, the telephony services signal processing system identifies signals to instruct the telephony infrastructure provider to route the call to the user. Otherwise, the telephony services signal processing system blocks the call from the user (1035). More particularly, the telephony services signal processing system identifies signals to instruct the telephony infrastructure provider to block the call from the user. The identified signals are executed to handle the call in the identified manner.

In the process 1100 of FIG. 11, a call is handled based on an importance of the call, amounts of time for which participants in the call have participated in telephone calls, and online presence of the participants in the call. The telephony services signal processing system receives an indication of a rule that considers the above factors when indicating how a call from a first user to a second user should be handled (1105).

The telephony services signal processing system receives an indication of a call from the first user to the second user (1110). The telephony services signal processing system identifies the call handling rule as associated with the first user. In order to determine how the call should be handled in accordance with the rule, the telephony services signal processing system identifies an amount of telephone-based communication that has occurred between the first and second users (1115). The telephony services signal processing system compares the identified amount to a threshold indicating a maximum allowable amount of telephone based communication that may occur between the first and second users (1120).

If the identified amount exceeds the threshold (1125), then the telephony services signal processing system determines whether the call is important (1130). For example, the telephony services signal processing system may determine the call is important based on whether the call is to or from an emergency service (e.g., a 911 service). If the call is important, then the telephony services signal processing system allows the call for one minute, even though the first and second users have already communicated for more than the maximum allowable amount of time (1135).

If the call is not important (1130), then the telephony services signal processing system determines whether the first and second users are online (1140). If the first and second users are online, then the first and second users may communicate, for example, with e-mail or instant messages instead of with a telephone call. Specifically, if the first and second users are online, the telephony services signal processing system informs the first user that the second user is online (1145), before blocking the call. Also, and regardless of whether the first and second users are online, the call is blocked (1150) upon determining that a call is not important (1130).

By contrast, if the identified amount exceeds the threshold (1125), then the telephony services signal processing system determines whether the first user and the second user are online (1155). If the first user and the second user are not online, then the telephony services signal processing system simply allows the call to connect (1160). Otherwise, the telephony services signal processing system determines whether the call is important (1165). If the call is important, then the telephony services signal processing system allows the call to connect (1160). If the call is not important, then the telephony services signal processing system informs the first user that the second user is online (1170) before allowing the call to connect (1160).

Control signals for handling a call are described throughout as first being identified and then being distributed for execution. However, control signals may be identified throughout the entire duration of the call, and the control signals may be distributed as they are identified. As a result, the call may be continually and asynchronously controlled through the entire call, rather than being controlled at one or more points within the call. When control signals are identified at multiple points during a call, different features or applications may be used at each of the multiple points to identify the signals.

A voice gateway router is described throughout as a single entity to which signaling and voice paths are established such that calls to telephones serviced by the voice gateway router may be controlled. In particular implementations of the described techniques, the voice gateway router may include multiple subsystems that collectively operate as the voice gateway router described herein. For example, the voice gateway router may include one or more subsystems that are analogous to a telephony services signaling processing 150 of FIG. 1 such that control signals may be identified for calls that are not handled by an external telephony services provider, such as the telephony services provider 115 of FIG. 1. However, such subsystems may not access the information included in the telephony services provider, such as the information included in the telephony services back-end system 155 of FIG. 1.

A VoIP telephony system is described throughout as a telephone system in which calls are operated by a telephony infrastructure provider and are controlled by a telephony services provider. However, other telephone systems may be used to enable a telephony services provider to control calls operated by a telephony infrastructure provider. For example, the telephony services provider may be applied to a circuit-switched implementation of the described techniques such that calls between telephones connected to a circuit switched telephone network provided by a telephony infrastructure provider may be controlled by an external telephony services provider.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for managing an outgoing telephone call, the method comprising the following operations performed with at least one processor:

receiving a request for a telephone call to a first call participant from a second call participant;

accessing, from a database, a plurality of groups that are specified by the second call participant, each group including one or more users of an electronic communications system for which contact information is maintained;

determining whether the first call participant is identified in at least one of the groups of users;

accessing, for the identified group, a rule specified by the second call participant that indicates a manner in which electronic communications of the first or second call participants should be handled; and providing instructions to handle the call in accordance with a manner identified in the accessed rule.

2. The method of claim 1 wherein:

accessing a rule comprises accessing a rule that indicates how the call should be handled based on an availability of the first call participant or the second call participant to participate in the call, and providing instructions to handle the call comprises:

accessing an indication of an availability of the first call participant or the second call participant to participate in the call; and providing instructions to handle the call based on the accessed indication of availability.

3. The method of claim 2 wherein accessing an indication of availability of the first call participant or the second call participant to participate in the call comprises accessing an indication of an event from an electronic calendar of the first call participant or the second call participant.

4. The method of claim 1 wherein:

accessing a rule comprises accessing a rule that indicates how the call should be handled based on an online presence of the first call participant or the second call participant; and providing instructions to handle the call comprises:
accessing an indication of an online presence of the first call participant or the second call participant; and
providing instructions to handle the call based on the accessed indication.

5. The method of claim 1 wherein:

accessing a rule comprises accessing a rule that indicates a time at which a call to the first call participant or from the second call participant is to be blocked; and providing instructions to handle the call comprises:
accessing an indication of a time at which the request for the call to the first call participant was received;
comparing the time at which the request was received to the time at which a call to the first call participant or from the second call participant is to be blocked; and
providing instructions to handle the call based on a result of the comparison.

6. The method of claim 1 wherein:

accessing a rule comprises accessing a rule that indicates a time at which a call to the first call participant or from the second call participant is to be allowed; and providing instructions to handle the call comprises:
accessing an indication of a time at which the request for the call to the first call participant was received;
comparing the time at which the request was received to the time at which a call to the first call participant or from the second call participant is to be allowed; and
providing instructions to handle the call based on a result of the comparison.

7. The method of claim 1 wherein:

accessing a rule comprises accessing a rule that indicates a maximum allowable amount of time for which the first call participant may participate in telephone calls during a period of time; and providing instructions to handle the call comprises:
accessing an indication of an amount of time for which the first call participant has participated in telephone calls during the period of time;
comparing the amount of time for which the first call participant has participated in telephone calls to the maximum allowable amount of time; and
providing instructions to handle the call based on a result of the comparison.

8. The method of claim 7 wherein the amount of time comprises an aggregated amount of time for all telephone calls during the period of time.

9. The method of claim 7 wherein the amount of time comprises an amount of time spent with one second call participant, wherein the second accessing and the comparing steps are performed with respect to the amount of time spent with the second call participant during the period of time.

10. The method of claim 1 wherein:

accessing a rule comprises accessing a rule that indicates a maximum allowable number of telephone calls in which the first call participant may participate during a period of time; and providing instructions to handle the call comprises:
accessing an indication of a number of telephone calls in which the first call participant has participated during the period of time;
comparing the number of telephone calls in which the first call participant has participated to the maximum allowable number of telephone calls; and
providing instructions to handle the call based on a result of the comparison.

11. The method of claim 1 wherein:

accessing a rule comprises accessing a rule that indicates at least one person to whom the second call participant may or may not place telephone calls; and providing instructions to handle the call comprises:
identifying the first call participant as a person to whom the call was placed;
comparing the first call participant to the at least one indicated person; and
providing instructions to handle the call based on a result of the comparison.

12. The method of claim 11 wherein the person is identified and the rule is accessed by at least one of an online identifier, a given name, an alias, a phone number, and another identifier.

13. The method of claim 1 wherein:

accessing a rule comprises accessing a rule that indicates at least one person from whom the first call participant may or may not receive telephone calls; and providing instructions to handle the call comprises:
identifying the second call participant as a person from whom the call was received;
comparing the second call participant to the at least one indicated person; and
providing instructions to handle the call based on a result of the comparison.

14. The method of claim 13 wherein the person is identified and the rule is accessed by at least one of an online identifier, a given name, an alias, a phone number, and another identifier.

15. The method of claim 1 wherein:

accessing a rule comprises accessing a rule that indicates how the call should be handled based on an importance of the call, and providing instructions to handle the call comprises:
accessing an indication of an importance of the call; and
providing instructions to handle the call based on the accessed indication.

16. The method of claim 1 wherein:

accessing a rule comprises accessing a rule that indicates how the call should be handled based on a characteristic of the first call participant or the second call participant, and providing instructions to handle the call comprises:
accessing an indication of a characteristic of the first call participant or the second call participant; and
providing instructions to handle the call based on the accessed indication.

17. The method of claim 16 wherein the characteristic is at least one of an age, a gender, an occupation, a location, a characteristic indicated by a profile of the first or second call participant, a characteristic indicated by other electronic content associated with the first or second call participant, or another characteristic of the first or second call participant.

18. The method of claim 1 wherein:
accessing a rule comprises accessing a rule that indicates that the call should be delivered to an intended recipient if the intended recipient is included in the group of one or more users; and
providing instructions to handle the call comprises:
determining that the first call participant is included in the group of one or more users; and
determining that the call should be delivered to the first call participant because the first call participant is included in the group of one or more users.

19. The method of claim 1 wherein providing instructions to handle comprises providing instructions so that the second call participant is identified for the first call participant before the first call participant is allowed to answer the call.

20. The method of claim 1 wherein providing instructions to handle the call comprises providing instructions so that the call is delivered to the first call participant.

21. The method of claim 1 wherein providing instructions to handle the call comprises providing instructions so that the call is blocked from the first call participant.

22. The method of claim 1 wherein providing instructions to handle the call comprises providing instructions so that the call is rung with an identified tone for the first call participant.

23. The method of claim 1 wherein providing instructions to handle the call comprises providing instructions so that the call is ring busy for the second call participant.

24. The method of claim 1 wherein providing instructions to handle the call comprises providing instructions so that the call is routed to an identified system that is different than a system to which the call was to be routed originally.

25. The method of claim 24 wherein the different system is a voicemail system.

26. The method of claim 1 wherein providing instructions to handle the call comprises providing instructions to present an alert of the call to the first call participant.

27. The method of claim 1 wherein providing instructions to handle the call comprises providing instructions to play a pre-recorded message to the first call participant or the second call participant.

28. The method of claim 1 wherein receiving a request for a telephone call comprises receiving, at a telephony services provider, the request for the telephone call over a signaling path from a first telephony proxy server associated with the first call participant or from a second telephony proxy server associated with the second call participant, the first and second telephony proxy servers being controlled by a telephony infrastructure provider.

29. The method of claim 28 wherein accessing the plurality of groups of users comprises accessing, at the telephony services provider, the plurality of groups of users from a back-end system controlled by the telephony services provider.

30. The method of claim 28 wherein accessing the rule comprises accessing, at the telephony services provider, the rule from a back-end system controlled by the telephony services provider.

31. The method of claim 28 further comprising
establishing a voice path between the first telephony proxy server and the second telephony proxy server; and
controlling the voice path with signals sent from the telephony services provider to the first proxy server over a first signaling path or to the second telephony proxy server over a second signaling path, the signals indicating the identified manner in which the call should be handled.

32. The method of claim 1 wherein accessing a plurality of groups of users of an electronic communications system comprises accessing at least one group of users of an instant messaging system for which presence information is maintained.

33. The method of claim 1 wherein the database comprises an address book of an e-mail system.

34. The method of claim 1, further comprising enabling the second call participant to specify each group of one or more users by specifying user identifiers for inclusion in each group.

35. The method of claim 34, wherein enabling the second call participant to specify each group comprises enabling the second call participant to manually select the user identifiers for inclusion in each group.

36. The method of claim 34, wherein enabling the second call participant to specify each group includes enabling the second call participant to specify one or more users for inclusion in each group.

37. The method of claim 36, wherein enabling the second call participant to specify each group comprises enabling the second call participant to manually select particular user identifiers for inclusion in each group of one or more users.

38. The method of claim 36, wherein at least one group includes multiple users.

39. The method of claim 36, wherein at least one group corresponds to a family of the second call participant or users that are part of a buddy list of the second call participant.

40. The method of claim 1, further comprising:
determining if an indication of a scheduled calendar event exists in an electronic calendar of the first or second call participant; and
if the indication of a scheduled calendar event exists in an electronic calendar of the first or second call participant, automatically routing the telephone call to a different system in accordance with the accessed rule for the identified group.

41. The method of claim 40, wherein the different system is a voicemail system.

42. The method of claim 40, further comprising:
if the indication of a scheduled calendar event exists in an electronic calendar of the first or second call participant, still allowing the telephone call to proceed to the first call participant in accordance with the accessed rule for the identified group.

43. The method of claim 1, further comprising accessing a plurality of rules for the identified group.

44. A non-transitory computer-readable medium storing instructions that, when executed by a processor, cause the processor to perform operations for managing an outgoing telephone call, the operations comprising:
receiving a request for a telephone call to a first call participant from a second call participant;
accessing, from a database, a plurality of groups that are specified by the second call participant, each group including one or more users of an electronic communications system for which contact information is maintained;
determining whether the first call participant is identified in at least one of the groups of users;

accessing, for the identified group, a rule specified by the second call participant that indicates a manner in which electronic communications of the first or second call participants should be handled; and providing instructions to handle the call in accordance with a manner identified in the accessed rule.

45. The non-transitory computer-readable medium of claim 44, wherein the operations further comprise enabling the second call participant to specify each group of one or more users by specifying user identifiers for inclusion in each group.

46. A system for managing an outgoing telephone call, the system comprising:

at least one processor;

a memory storing instructions which, when executed by the at least one processor, cause the at least one processor to perform operations comprising:

receiving a request for a telephone call to a first call participant from a second call participant;

accessing, from a database, a plurality of groups that are specified by the second call participant, each group including one or more users of an electronic communications system for which contact information is maintained;

determining whether the first call participant is identified in at least one of the groups of users;

accessing, for the identified group, a rule specified by the second call participant that indicates a manner in which electronic communications of the first or second call participants should be handled; and providing instructions to handle the call in accordance with a manner identified in the accessed rule.

47. The system of claim 46, further comprising instructions to cause the at least one processor to perform the operation of:

enabling the second call participant to specify each group of one or more users by specifying user identifiers for inclusion in each group.

\* \* \* \* \*

UNITED STATES PATENT AND TRADEMARK OFFICE
CERTIFICATE OF CORRECTION

PATENT NO. : 9,462,122 B1
APPLICATION NO. : 11/146284
DATED : October 4, 2016
INVENTOR(S) : Peter Bates Page 1 of 1

It is certified that error appears in the above-identified patent and that said Letters Patent is hereby corrected as shown below:

In the Claims

Claim 19, col. 29, line 18, "to handle comprises" should read --to handle the call comprises--.

Signed and Sealed this
Twentieth Day of December, 2016

Michelle K. Lee
*Director of the United States Patent and Trademark Office*